United States Patent
Watanabe et al.

(10) Patent No.: US 9,134,475 B2
(45) Date of Patent: Sep. 15, 2015

(54) FRONT LIGHT AND METHOD FOR PRODUCING SAME, REFLECTIVE DISPLAY DEVICE PROVIDED WITH FRONT LIGHT, AND ELECTRONIC EQUIPMENT PROVIDED WITH REFLECTIVE DISPLAY DEVICE

(75) Inventors: Hisashi Watanabe, Osaka (JP); Tomoko Teranishi, Osaka (JP); Toshiki Matsuoka, Osaka (JP); Takahiro Nakahara, Osaka (JP); Takuma Tomotoshi, Osaka (JP); Eiji Satoh, Osaka (JP); Kohzoh Nakamura, Osaka (JP); Yohzoh Narutaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 14/233,225

(22) PCT Filed: Jun. 27, 2012

(86) PCT No.: PCT/JP2012/066440
§ 371 (c)(1),
(2), (4) Date: Jan. 16, 2014

(87) PCT Pub. No.: WO2013/011813
PCT Pub. Date: Jan. 24, 2013

(65) Prior Publication Data
US 2014/0146563 A1    May 29, 2014

(30) Foreign Application Priority Data
Jul. 21, 2011   (JP) ................................. 2011-160254

(51) Int. Cl.
*F21V 8/00*      (2006.01)
*G02F 1/1335*   (2006.01)

(52) U.S. Cl.
CPC ............ *G02B 6/0043* (2013.01); *G02B 6/0055* (2013.01); *G02F 2001/133616* (2013.01)

(58) Field of Classification Search
CPC ................ G02B 6/0043; G02B 6/0055; G02F 2001/133616
USPC .................................................. 362/606, 607
See application file for complete search history.

(56) References Cited

U.S. PATENT DOCUMENTS

| | | | |
|---|---|---|---|
| 6,940,570 B1 | 9/2005 | Sumida et al. | |
| 2002/0172031 A1 | 11/2002 | Masuda | |
| 2010/0073911 A1 | 3/2010 | Ohkawa | |
| 2010/0110724 A1* | 5/2010 | Moncrieff | ..................... 362/606 |

FOREIGN PATENT DOCUMENTS

| | | |
|---|---|---|
| JP | 11-109344 A | 4/1999 |
| JP | 2000-75293 A | 3/2000 |

(Continued)

OTHER PUBLICATIONS

Official Communication issued in International Patent Application No. PCT/JP2012/066440, mailed on Aug. 7, 2012.

*Primary Examiner* — Stephen F Husar
(74) *Attorney, Agent, or Firm* — Keating & Bennett, LLP

(57) ABSTRACT

A front light (1) includes a light source (8), a light guide plate (9), and a plurality of dots (4) that are provided on a surface of the light guide plate (9), which surface faces a light exit surface of the light guide plate (9). Each of the plurality of dots (4) includes (i) a light reflective layer (2) for reflecting light toward the light guide plate (9), and (ii) a dark layer (3) for absorbing light, the dark layer completely covering the light reflective layer (2) so as to be in contact with the light guide plate (9) without any gap between the light guide plate (9) and the dark layer (3).

20 Claims, 18 Drawing Sheets

(56) References Cited

FOREIGN PATENT DOCUMENTS

| JP | 2002-108227 A | 4/2002 |
|---|---|---|
| JP | 2003-257227 A | 9/2003 |
| JP | 2005-123046 A | 5/2005 |
| JP | 2010-73574 A | 4/2010 |
| JP | 2010-78692 A | 4/2010 |
| WO | 00/32981 A1 | 6/2000 |

* cited by examiner

FRONT LIGHT AND METHOD FOR PRODUCING SAME, REFLECTIVE DISPLAY DEVICE PROVIDED WITH FRONT LIGHT, AND ELECTRONIC EQUIPMENT PROVIDED WITH REFLECTIVE DISPLAY DEVICE

TECHNICAL FIELD

The present invention relates to (i) a front light, (ii) a method of producing the front light, (iii) a reflective display device including the front light, and (iv) an electronic device including the reflective display device.

BACKGROUND ART

Under a dark environment where no surrounding light is present, a user cannot recognize display on a non-light emitting display device, such as a reflective liquid crystal display device, an electrophoretic display device or an electrowetting display device, which carries out the display while reflecting surrounding light such as outside light. In order to allow a user to recognize display under such a dark environment, some of such non-light emitting display devices include, above a front surface of a display panel, a front light which illuminates the display panel.

A front light should have first and second properties below. The first property is that the front light itself is transparent so that display (a display panel) can be recognized via the front light. The second property is that (i) light emitted from the front light is mainly directed toward the display panel and (ii) less light leaks toward a user. The first property can be attained by employing a transparent light guide plate.

In order to attain the second property, a ratio of an emission intensity of light which leaks toward a user to an emission intensity of light to be emitted toward the display panel should be more than 100. The reason why the ratio should be more than 100 will be described below with reference to FIG. 22. FIG. 22 is an explanatory view for describing an emission intensity of light of a conventional reflective display device 30.

As illustrated in FIG. 22, assume that a front light 11 of the reflective display device 30 (i) emits, toward a display panel 15, light A whose emission intensity is 100 cd/m² and (ii) emits, toward a user, light B whose emission intensity is 5 cd/m². Assume also that (i) a reflectance of a region 16 of the display panel 15, which region 16 carries out white display, is 10% and (ii) a reflectance of a region 17 of the display panel 15, which region 17 carries out black display, is 1%. That is, a contrast between the region 16 and the region 17 is 10. In this case, light C of the light A, which light C has entered the region 16 which carries out white display, is reflected at a reflectance of 10% in the region 16 to exit as light whose emission intensity is 10 cd/m². On the other hand, light D of the light A, which light D which has entered the region 17 which carries out black display, is reflected at a reflectance of 1% in the region 17 to exit as light whose emission intensity is 1 cd/m². Since the light B whose emission intensity is 5 cd/m² leaks toward the user from the front light 11, the reflective display device 30 has (i) a white luminance of 15 (=10+5) cd/m² and (ii) a black luminance of 6 (=1+5) cd/m². Consequently, the contrast is decreased down to 2.5. This causes a deterioration in display of the reflective display device 30.

Table 1 below shows the contrast of the reflective display device 30 in a case where an emission intensity ratio (A/B) of light A to light B from the front light 11 varies.

TABLE 1

| Emission intensity (A) toward display device | Emission intensity (B) toward display device | Ratio (A/B) | White luminance of display device | Black luminance of display device | Contrast of display device |
|---|---|---|---|---|---|
| 100 | 10.0 | 10 | 20.0 | 11.0 | 1.8 |
| 100 | 5.0 | 20 | 15.0 | 6.0 | 2.5 |
| 100 | 3.3 | 30 | 13.3 | 4.3 | 3.1 |
| 100 | 2.5 | 40 | 12.5 | 3.5 | 3.6 |
| 100 | 2.0 | 50 | 12.0 | 3.0 | 4.0 |
| 100 | 1.0 | 100 | 11.0 | 2.0 | 5.5 |
| 100 | 0.5 | 200 | 10.5 | 1.5 | 7.0 |
| 100 | 0.3 | 300 | 10.3 | 1.3 | 7.8 |
| 100 | 0.3 | 400 | 10.3 | 1.3 | 8.2 |
| 100 | 0.2 | 500 | 10.2 | 1.2 | 8.5 |
| 100 | 0.1 | 1000 | 10.1 | 1.1 | 9.2 |

For practical use, the contrast of the reflective display device 30 should be not less than 5. Therefore, the emission intensity ratio of light A to light B should be more than approximately 100 (see Table 1).

Patent Literature 1 discloses a technique of suppressing leakage of light from a front light toward a user. FIG. 23 is a cross-sectional view illustrating a reflective display device disclosed in Patent Literature 1. Patent Literature 1 discloses a prism-type front light 11 (see FIG. 23) in which (i) a light guide plate 19 guides light emitted from a light source 18 and (ii) prisms, formed in the light guide plate 19, direct the light toward a display panel 15 (see arrow E in FIG. 23). Patent Literature 1 also discloses a method of illuminating the display panel 15 with such light from the prism-type front light 1. However, some of the light emitted from the light source 18 certainly leaks toward a user (see arrow F in FIG. 23) depending on an angle at which the light comes into contact with the prisms. Therefore, according to the front light 11 disclosed in Patent Literature 1, it is difficult to increase, to be more than 100, a ratio of (i) an emission intensity of light to be emitted toward the display panel 15 to (ii) an emission intensity of light which leaks toward the user. This makes it difficult for the reflective display device to carry out high-contrast display.

Patent Literature 2 discloses another technique of suppressing leakage of light from a front light toward a user. FIG. 24 is a cross-sectional view illustrating a reflective display device disclosed in Patent Literature 2. Patent Literature 2 discloses a front light 11 including a light guide plate 19 on which dots 14 are formed, each of which dots is constituted by a light reflective layer 12 and a dark layer 13 (see FIG. 24). Patent Literature 2 also discloses a method of illuminating a display panel 15 with light which has been guided in the light guide plate 19 and reflected by the light reflective layers 12 (see arrow G in FIG. 24).

CITATION LIST

Patent Literatures

Patent Literature 1
Specification of International Publication No. WO00/32981 (International Publication Date: Jun. 8, 2000)
Patent Literature 2
Japanese Patent Application Publication, Tokukai, No. 2002-108227 A (Publication Date: Apr. 10, 2002)

SUMMARY OF INVENTION

Technical Problem

However, according to the front light 11 disclosed in Patent Literature 2, it is difficult to carry out high-contrast display.

This is because light, which has been emitted from the light source 18 and come into contact with side surfaces of the light reflective layers 12 of the respective dots 14, leaks toward a user (see arrow H in FIG. 24). This is also because surrounding light, such as outside light, which has come into contact with the side surfaces, is reflected toward the user (see arrow I in FIG. 24).

As such, according to the front light 11 disclosed in Patent Literature 2, there exists light which comes into contact with the side surfaces of the reflective layers 12 and is reflected by the side surfaces toward the user. This causes a deterioration in contrast of the reflective display device 30. Such a deterioration in contract outstands particularly in a case where a viewer views the reflective display device 30 from an angle oblique to a direction normal to the light guide plate 19.

The present invention was made in view of the problems, and an object of the present invention is to provide (i) a front light which enables a reflective display device to carry out high-contrast display even when the reflective display device is viewed from any angles, (ii) a method of producing the front light, (ii) the reflective display device including the front light, and (iv) an electronic device including the reflective display device.

Solution to Problem

In order to attain the object, a front light of an embodiment of the present invention is configured to include: a light source for emitting light outward; a light guide plate for guiding the light of the light source; and a plurality of dots, provided on a surface of the light guide plate, which surface faces a light exit surface of the light guide plate, each of the plurality of dots including (i) a light reflective layer for reflecting light, the light reflective layer being provided so as to be in contact with the light guide plate and (ii) a dark layer for absorbing light, the dark layer completely covering the light reflective layer so as to be in contact with the light guide plate without any gap between the light guide plate and the dark layer.

According to the configuration, the front light of the embodiment of the present invention includes the plurality of dots each of which includes the light reflective layer and the dark layer. The dark layer completely covers the light reflective layer, and is in contact with the light guide plate without any gap between the light guide plate and the dark layer. That is, the light reflective layers of the respective plurality of dots are covered with the respective dark layers so as to be invisible even in a case where the plurality of dots are viewed from any angles.

In a case where such plurality of dots are formed on the light guide plate, light emitted from the light source is (i) guided in the light guide plate, and (ii) reflected by the light reflective layers, and then exits from the light exit surface. Some of the light emitted from the light source is guided in the light guide plate, and then exits toward a user. However, the light, which has exited toward the user, is absorbed by the dark layers. Surrounding light, such as outside light, which has entered the front light, is also absorbed by the dark layers.

Since the light reflective layers are completely covered by the dark layers in the respective plurality of dots, it is possible for the dark layers to absorb (i) light which has leaked from the light guide plate toward a user and (ii) surrounding light which enters the front light. That is, since the light reflective layers are not exposed in side surfaces of the respective plurality of dots, it is possible to prevent (i) the light which has leaked from the light guide plate toward a user and (ii) the surrounding light which enters the front light, from being reflected by the light reflective layers to exit toward the user.

Therefore, by employing the front light of the embodiment of the present invention, a reflective display device can carry out high-contrast display even when the reflective display device is viewed from any angles.

In order to attain the object, a reflective display device of an embodiment of the present invention is configured to include: the above-described front light; and a display panel which is provided on a light exit surface side of the light guide plate.

According to the configuration, it is possible to provide a reflective display device which carries out high-contrast display even when the reflective display device is viewed from any angles.

In order to attain the object, an electronic device of an embodiment of the present invention is configured to include the above-described reflective display device.

According to the configuration, it is possible to provide an electronic device having a display screen which carries out high-contrast display even when the display screen is viewed from any angles.

In order to attain the object, a method, of an embodiment of the present invention, of producing a front light is configured to include the steps of: preparing a light source for emitting light outward; preparing a light guide plate for causing the light to exit from a light exit surface of the light guide plate while guiding the light of the light source; and providing a plurality of dots on a surface of the light guide plate, which surface faces the light exit surface, each of the plurality of dots including (i) a light reflective layer for reflecting light toward the light guide plate, and (ii) a dark layer for absorbing light, the dark layer completely covering the light reflective layer so as to be in contact with the light guide plate without any gap between the light guide plate and the dark layer.

According to the method, it is possible to provide a front light which enables a reflective display device to carry out high-contrast display even when the reflective display device is viewed from any angles.

For a fuller understanding of the nature and advantages of the invention, reference should be made to the ensuing detailed description taken in conjunction with the accompanying drawings.

Advantageous Effects of Invention

According to the front light of the embodiment of the present invention, since the light reflective layers are completely covered by the dark layers in the respective plurality of dots, it is possible for the dark layers to absorb (i) light which has leaked from the light guide plate toward a user and (ii) surrounding light which enters the front light. That is, since the light reflective layers are not exposed in side surfaces of the respective plurality of dots, it is possible to prevent (i) the light which has leaked from the light guide plate toward a user and (ii) the surrounding light which enters the front light, from being reflected by the light reflective layers to exit toward the user. Therefore, by employing the front light of the embodiment of the present invention, a reflective display device can carry out high-contrast display even when the reflective display device is viewed from any angles.

According to the method, of the embodiment of the present invention, of producing a front light, it is possible to provide a front light which enables a reflective display device to carry out high-contrast display even when the reflective display device is viewed from any angles.

Figure 2:
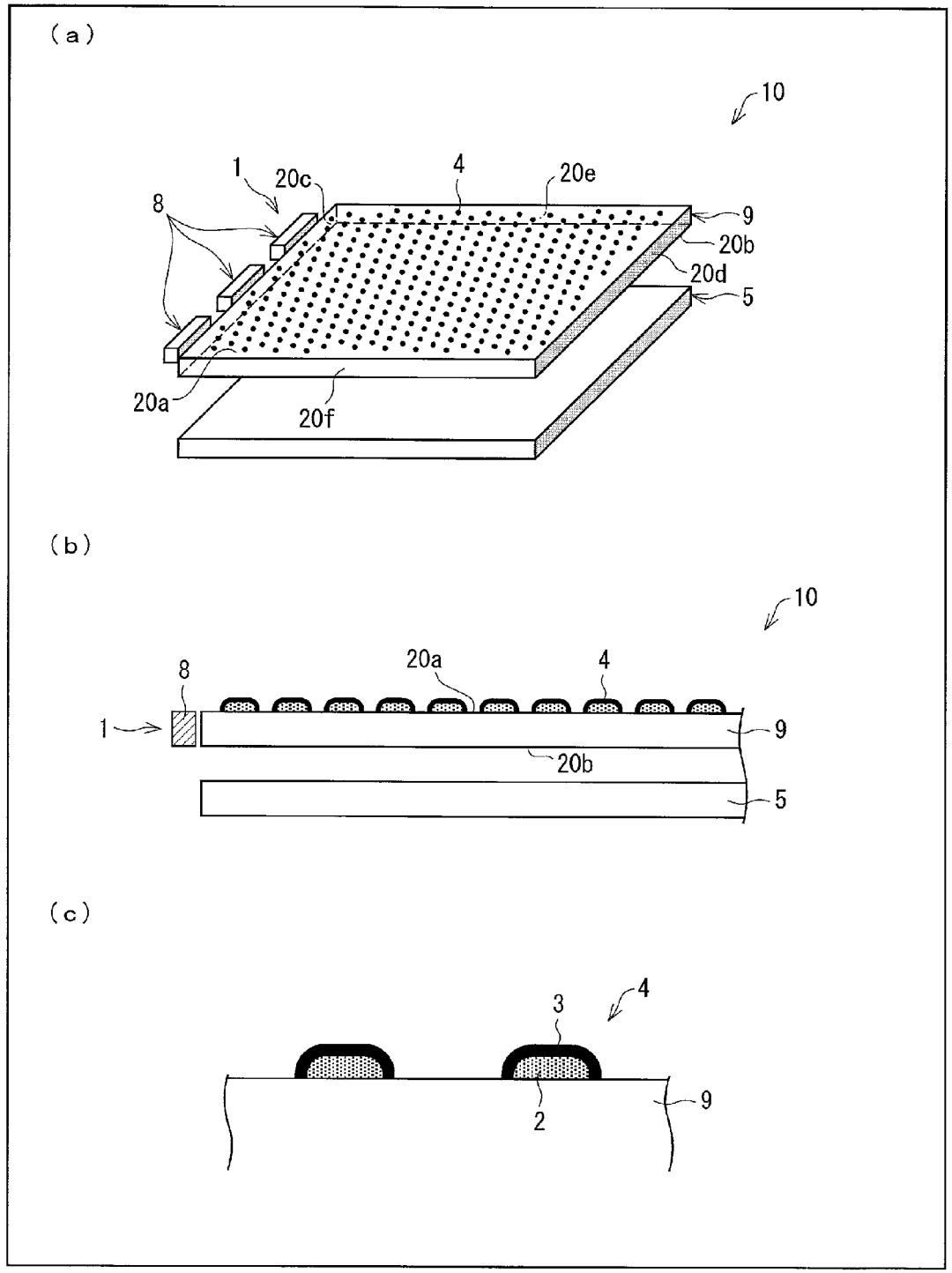

(a) of FIG. 2 is a perspective view illustrating a reflective display device in accordance with an embodiment of the present invention. (b) of FIG. 2 is a cross-sectional view illustrating the reflective display device in accordance with the embodiment of the present invention. (c) of FIG. 2 is an enlarged view illustrating a cross section of dots on a light guide plate in accordance with the embodiment of the present invention.

Figure 3:
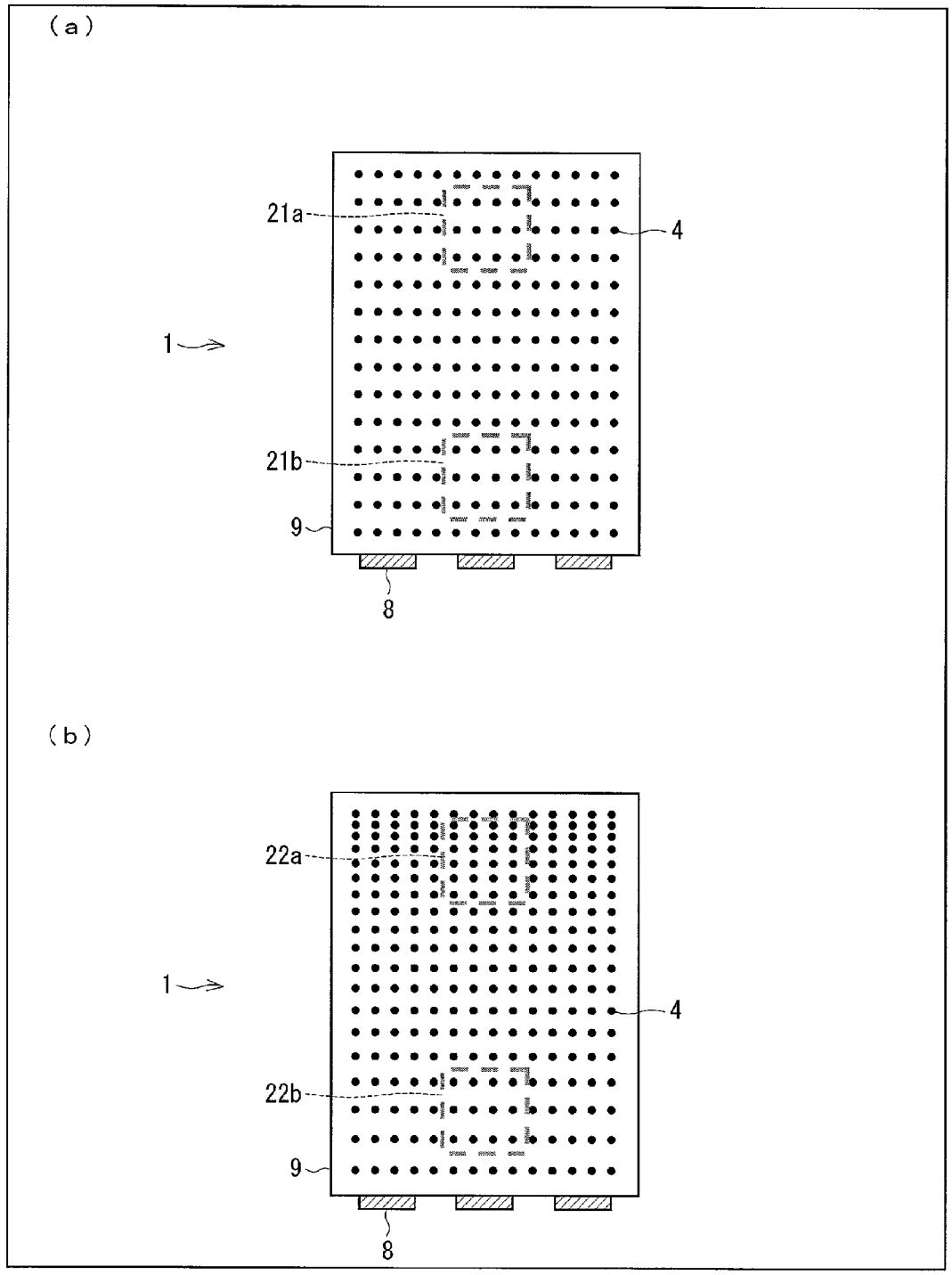

(a) of FIG. 3 is a view illustrating an example arrangement in which a plurality of dots are arranged at a constant area density of dots per minimum unit area. (b) of FIG. 3 is a view illustrating an example arrangement in which a plurality of dots are arranged so that an area density of dots per minimum unit area is not constant.

Figure 4:
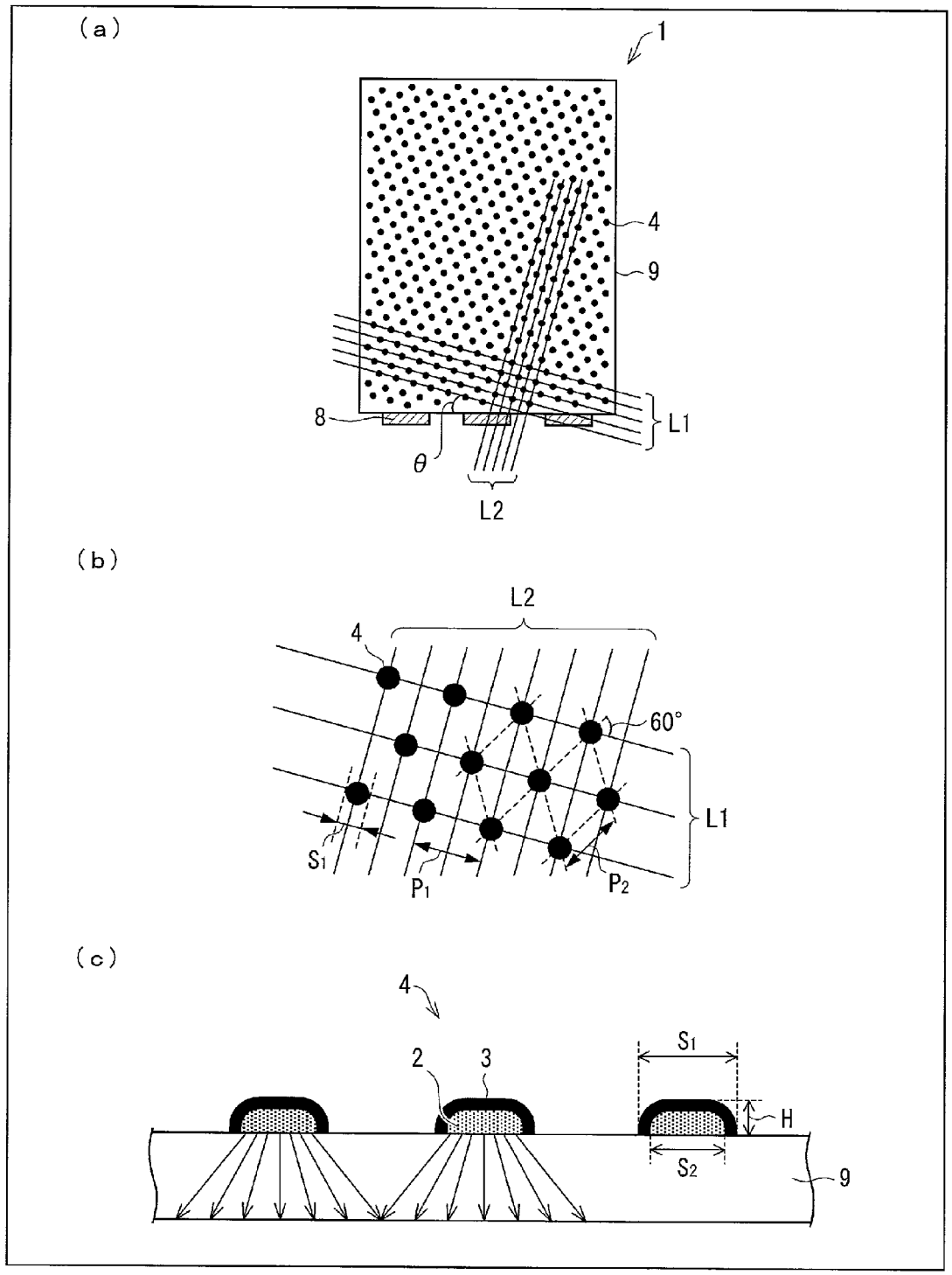

(a) of FIG. 4 is a view illustrating an example of an arrangement pattern in which dots are arranged on a light guide plate. (b) of FIG. 4 is an enlarged view illustrating the arrangement pattern illustrated in (a) of FIG. 4. (c) of FIG. 4 is an enlarged view illustrating a cross section of the dots on the light guide plate.

Figure 5:
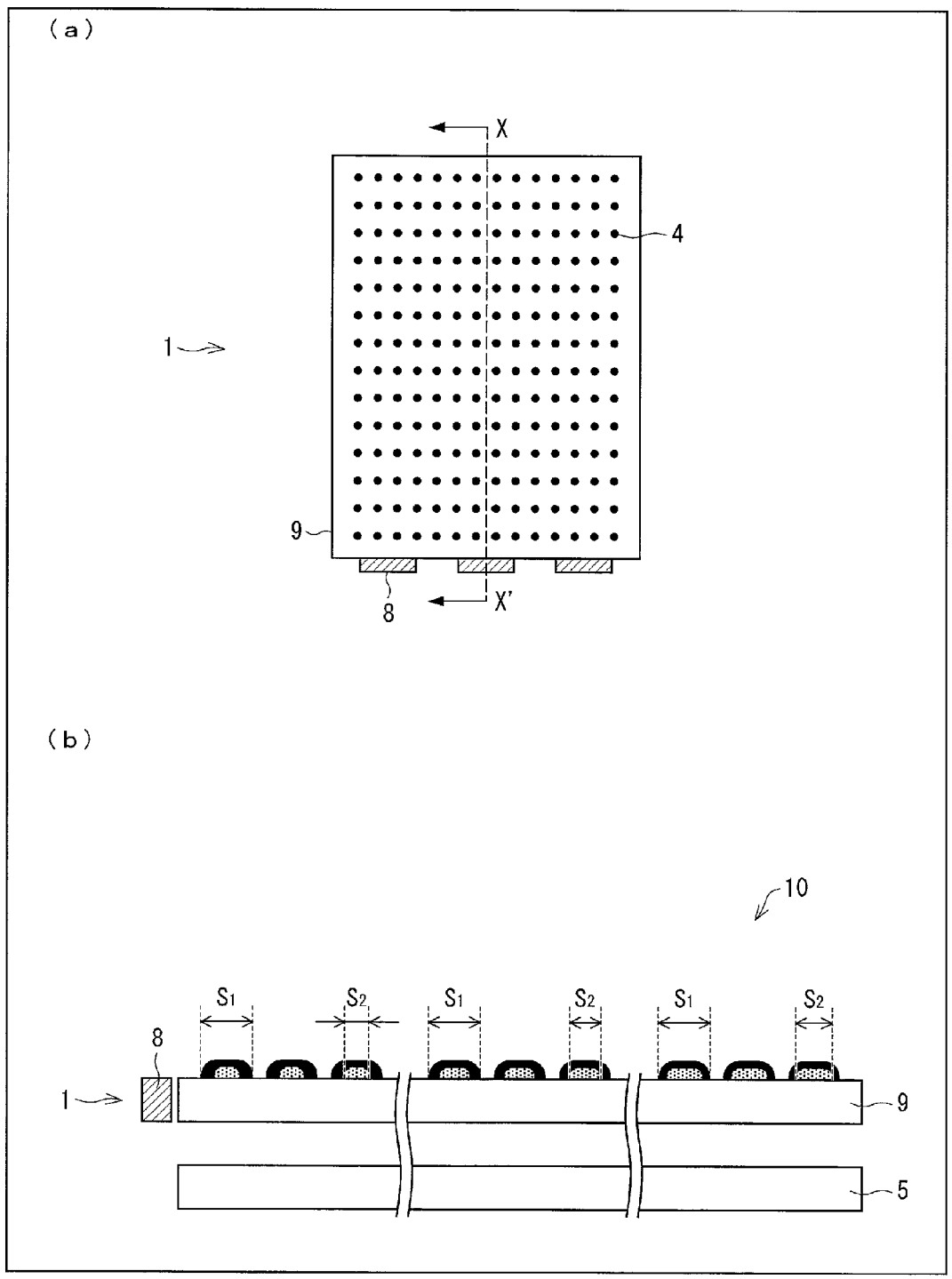

(a) of FIG. 5 is a view illustrating an example arrangement pattern in which dots are arranged on a light guide plate. (b) of FIG. 5 is a view illustrating a cross section taken along A-A' line illustrated in (a) of FIG. 5.

Figure 6:
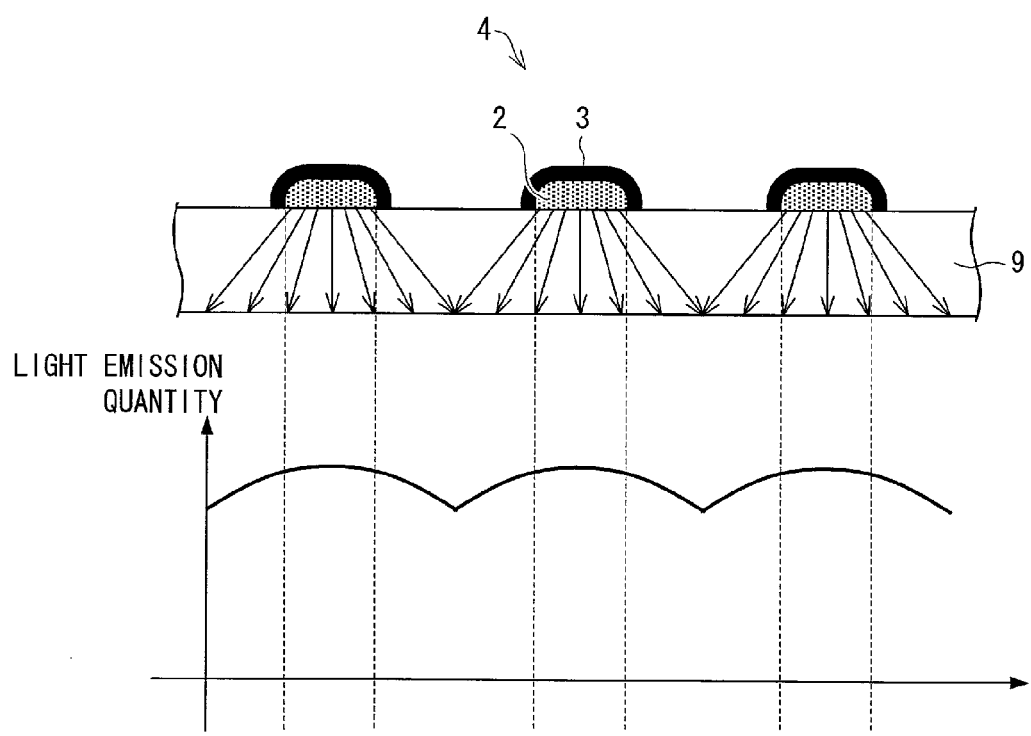

FIG. 6 is a view illustrating (i) light emission quantity of a front light in accordance with an embodiment of the present invention and (ii) a distribution of the light emission quantity.

Figure 7:
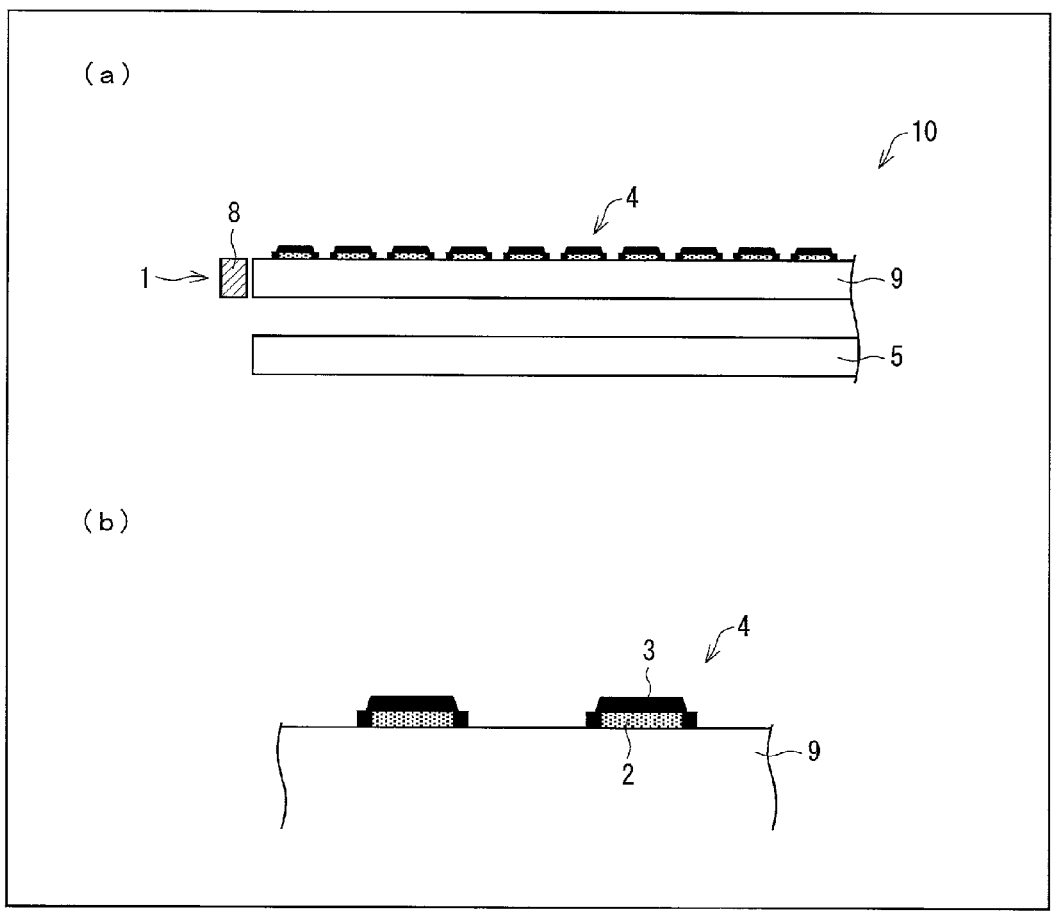

(a) of FIG. 7 is a cross-sectional view illustrating a reflective display device in accordance with another embodiment of the present invention. (b) of FIG. 7 is an enlarged view illustrating a cross section of dots on a light guide plate in accordance with the another embodiment of the present invention.

Figure 8:
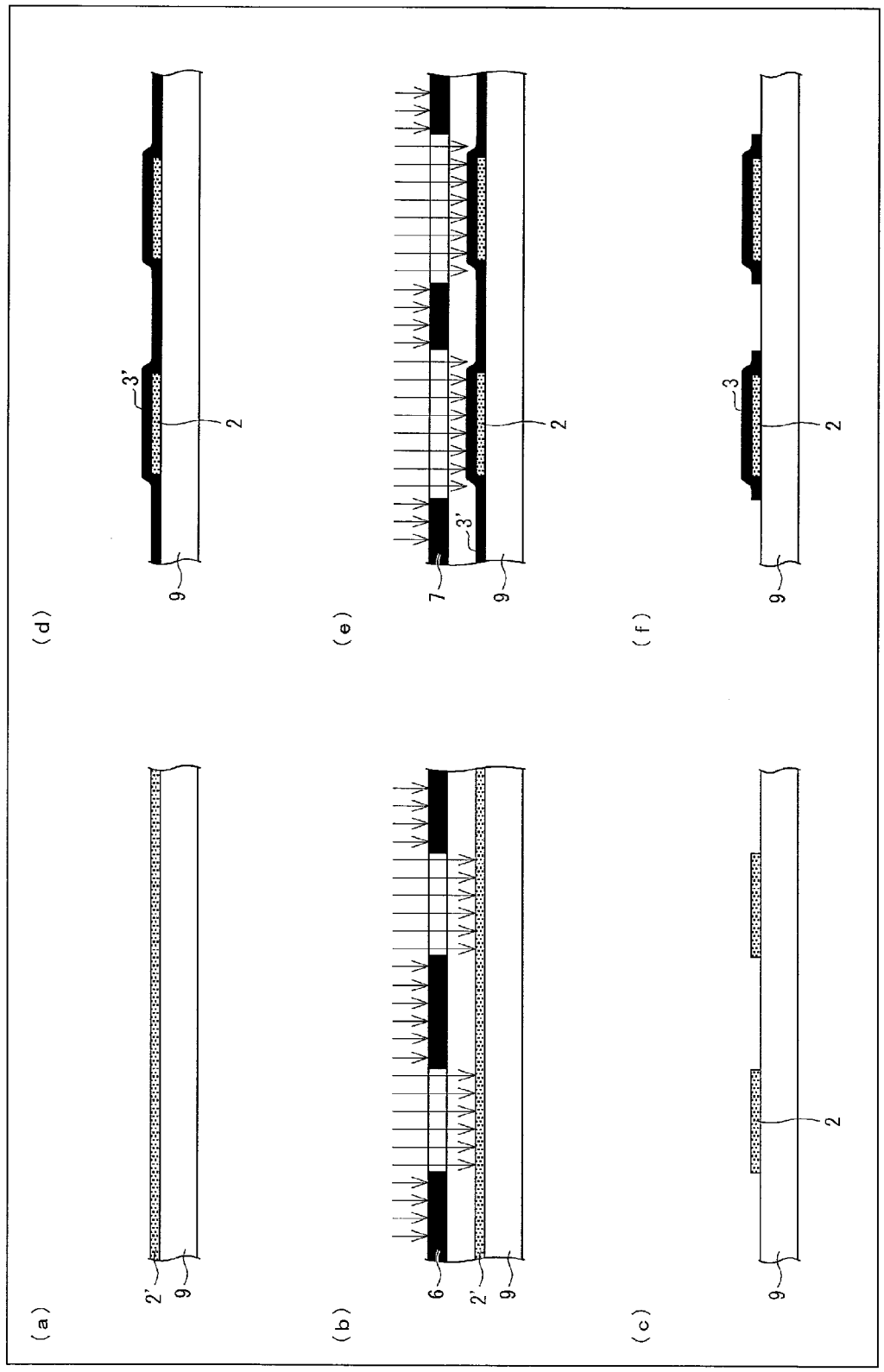

(a) through (f) of FIG. 8 are views illustrating a process of forming dots by use of a photolithographic method.

Figure 9:
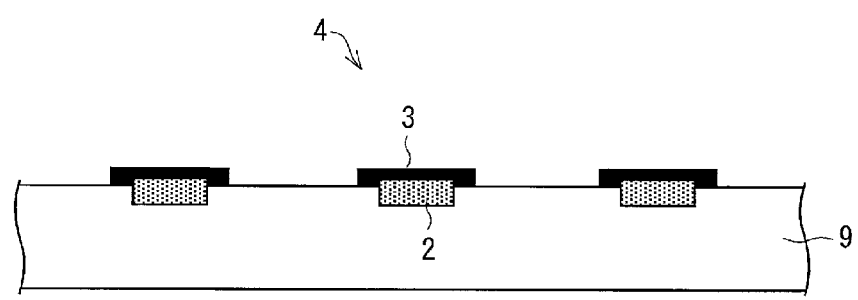

FIG. 9 is an enlarged view illustrating a cross section of dots on a light guide plate in accordance with another embodiment of the present invention.

Figure 10:
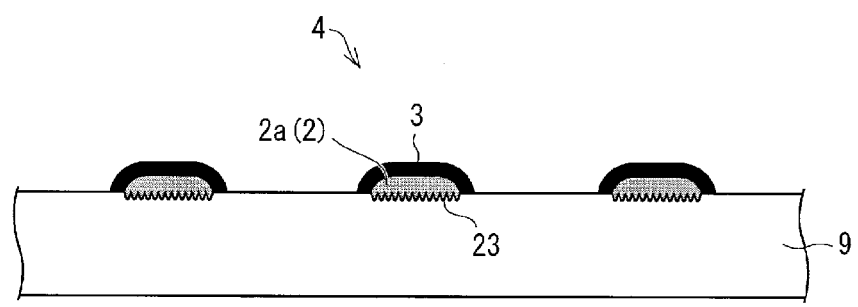

FIG. 10 is an enlarged view illustrating a cross section of dots on a light guide plate in accordance with another embodiment of the present invention.

Figure 11:
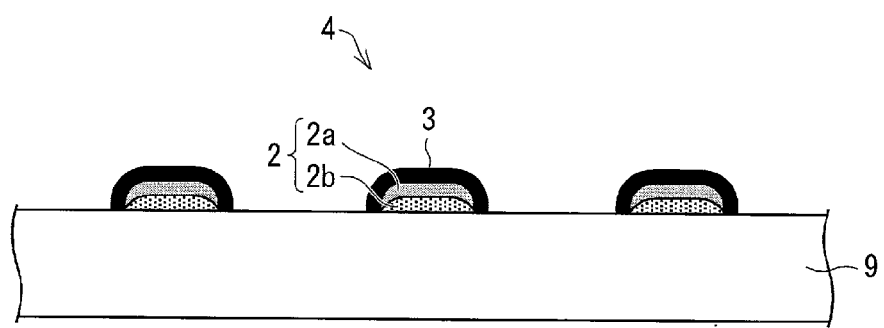

FIG. 11 is an enlarged view illustrating a cross section of dots on a light guide plate in accordance with another embodiment of the present invention.

Figure 12:
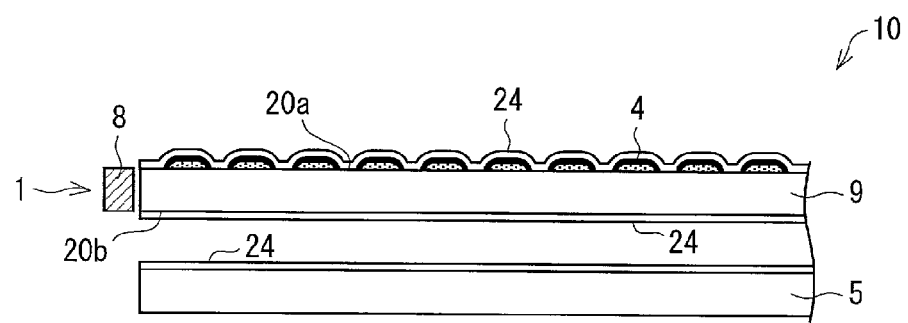

FIG. 12 is a cross-sectional view illustrating a reflective display device in accordance with another embodiment of the present invention.

Figure 13:
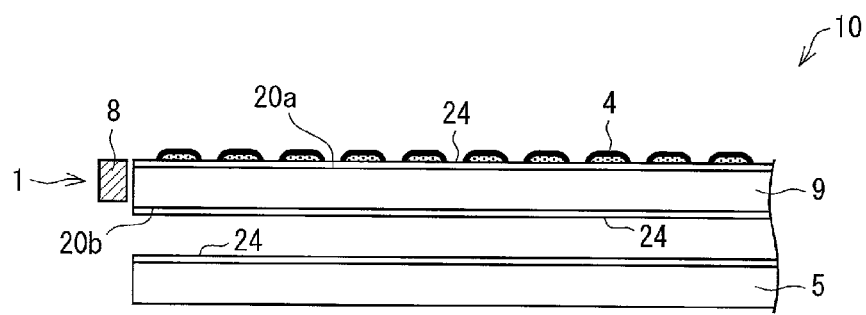

FIG. 13 is a cross-sectional view illustrating a reflective display device in accordance with another embodiment of the present invention.

Figure 14:
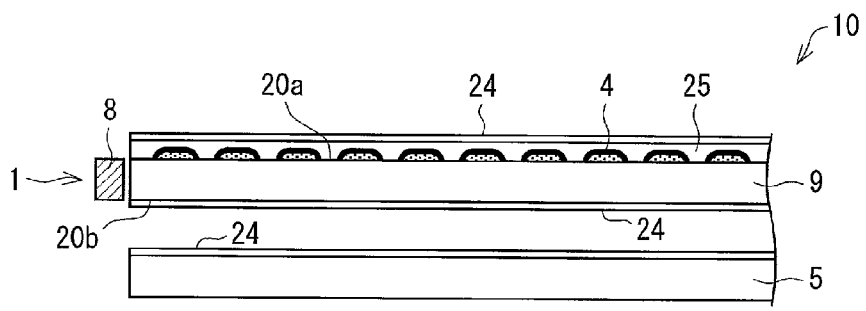

FIG. 14 is a cross-sectional view illustrating a reflective display device in accordance with another embodiment of the present invention.

Figure 15:
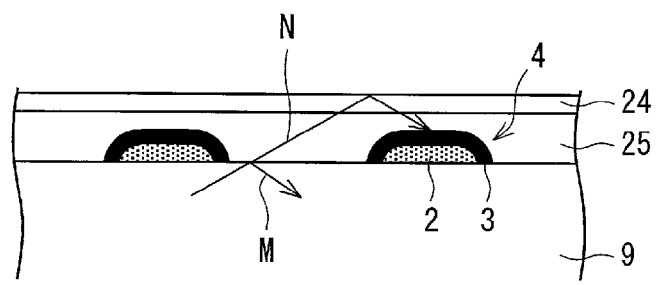

FIG. 15 is an enlarged view illustrating a cross section of dots on a light guide plate in accordance with another embodiment of the present invention.

Figure 16:
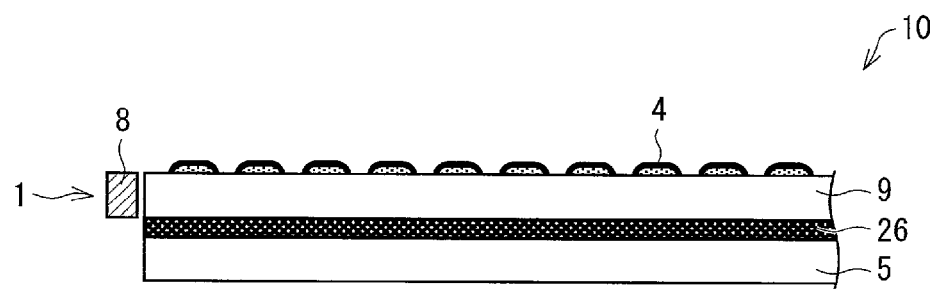

FIG. 16 is a cross-sectional view illustrating a reflective display device in accordance with another embodiment of the present invention.

Figure 17:
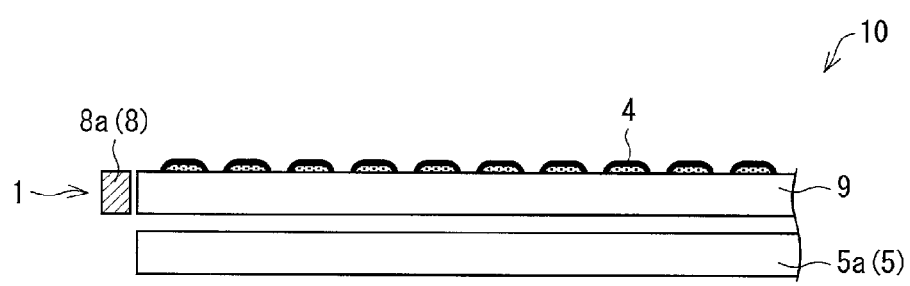

FIG. 17 is a cross-sectional view illustrating a reflective display device in accordance with another embodiment of the present invention.

Figure 18:
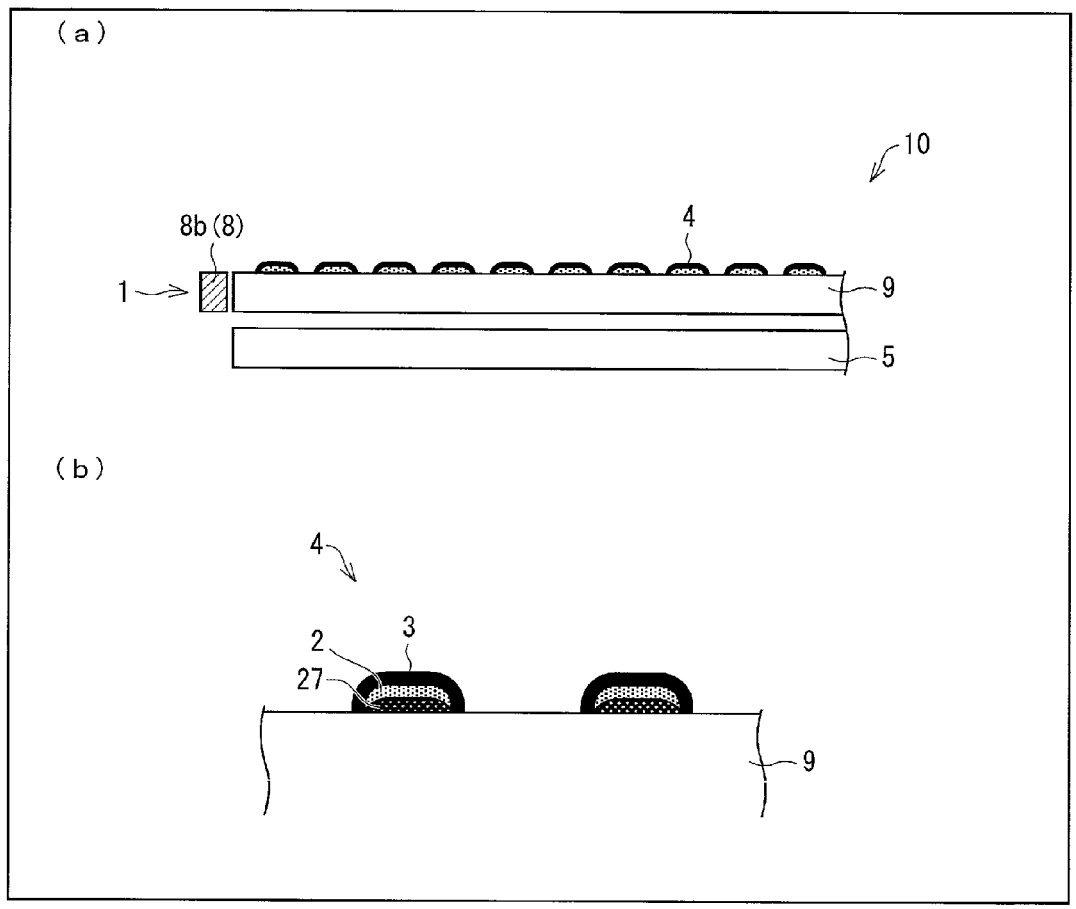

(a) of FIG. 18 is a cross-sectional view illustrating a reflective display device in accordance with another embodiment of the present invention. (b) of FIG. 18 is an enlarged view illustrating a cross section of dots on a light guide plate in accordance with the another embodiment of the present invention.

Figure 19:
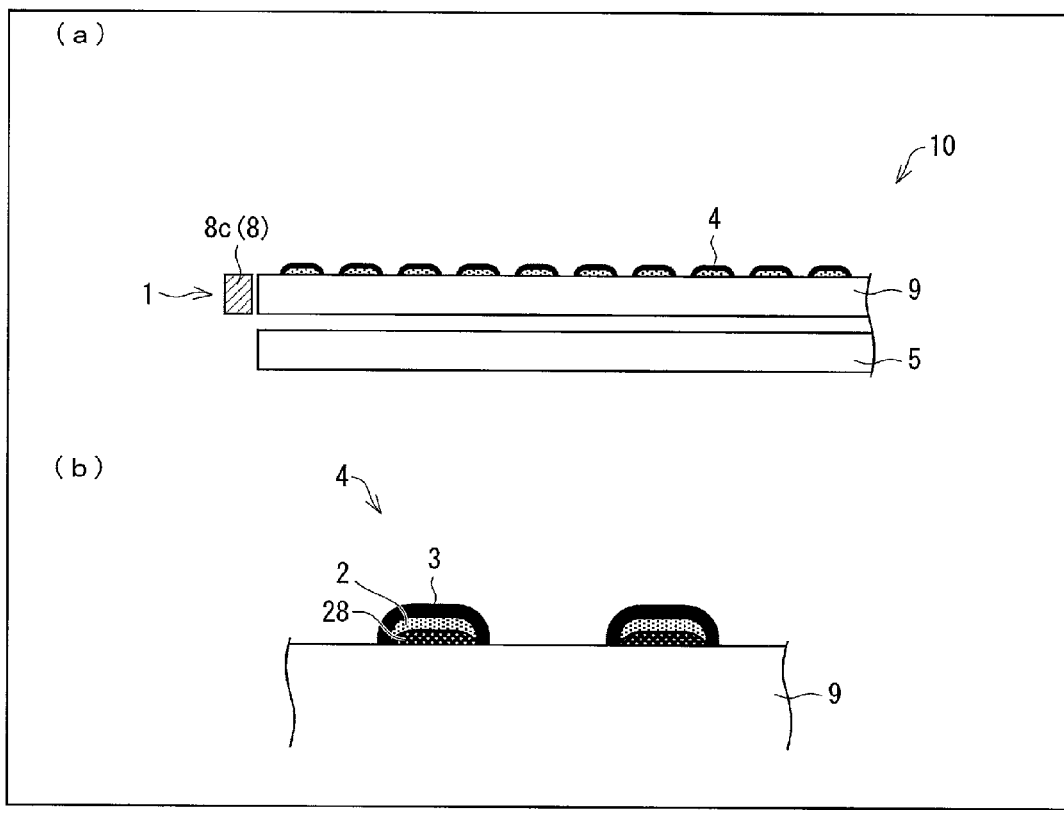

(a) of FIG. 19 is a cross-sectional view illustrating a reflective display device in accordance with another embodiment of the present invention. (b) of FIG. 19 is an enlarged view illustrating a cross section of dots on a light guide plate in accordance with another embodiment of the present invention.

Figure 20:
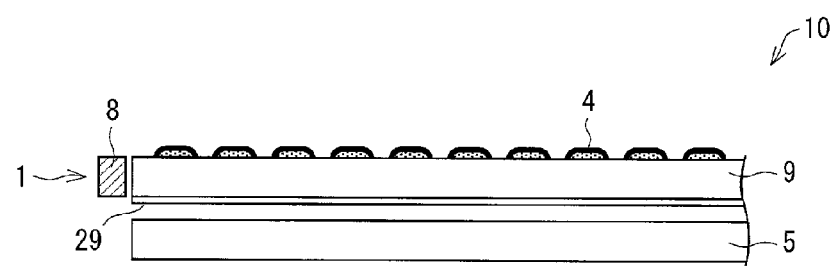

FIG. 20 is a cross-sectional view illustrating a reflective display device in accordance with another embodiment of the present invention.

Figure 21:
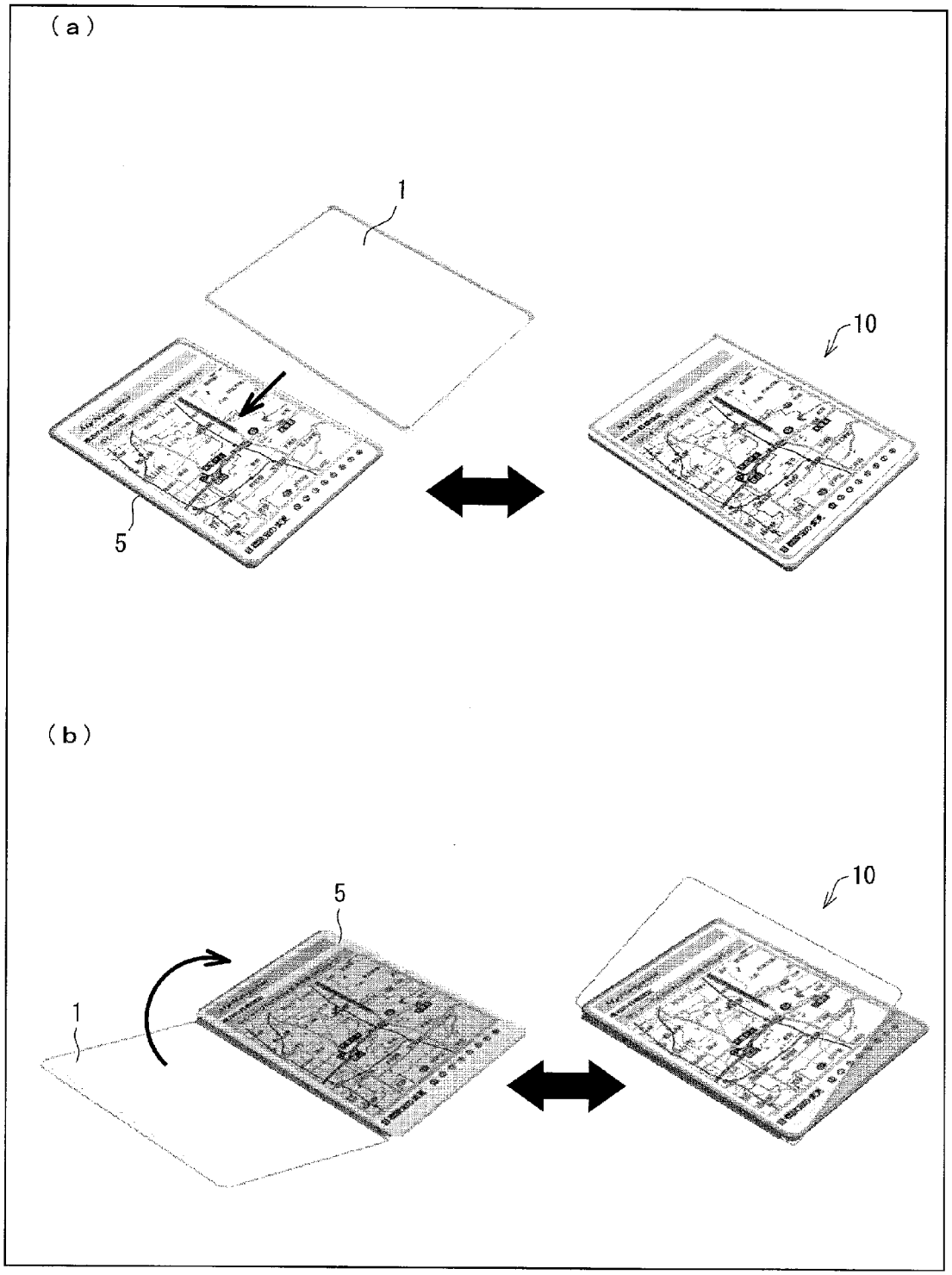

(a) of FIG. 21 is a view illustrating a display panel to or from which a front light can be attached or detached. (b) of FIG. 21 is a view illustrating a display panel which is combined with a front light that can cover the display panel.

Figure 22:
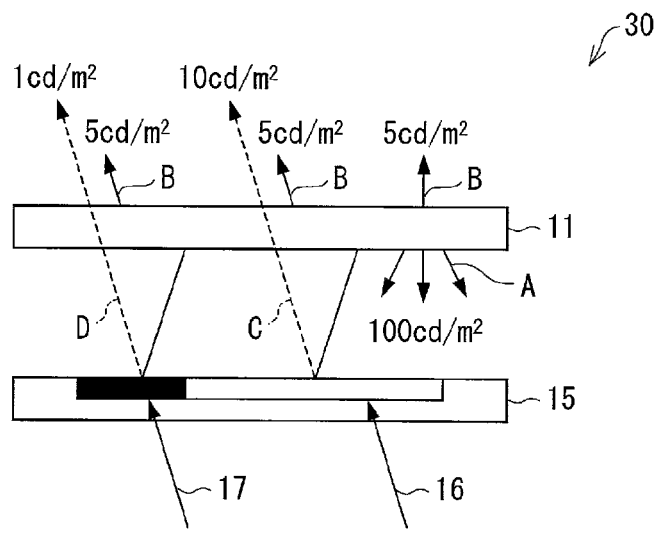

FIG. 22 is an explanatory view for describing an emission intensity of light of a conventional reflective display device.

Figure 23:
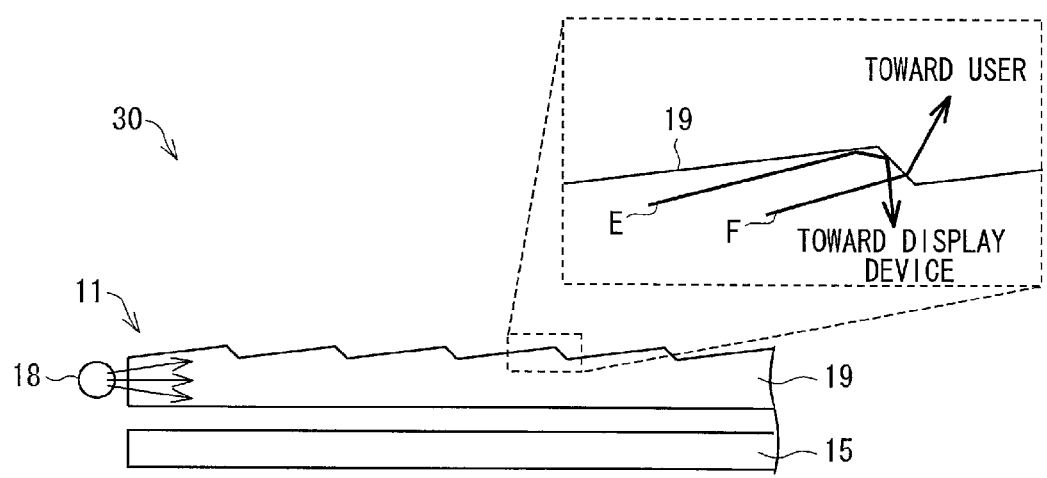

FIG. 23 is a cross-sectional view illustrating a conventional reflective display device.

Figure 24:
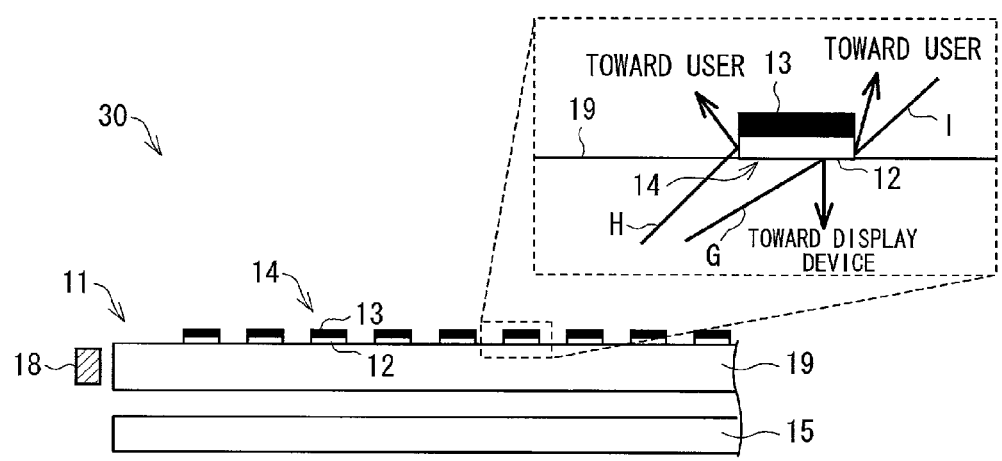

FIG. 24 is a cross-sectional view illustrating a conventional reflective display device.

DESCRIPTION OF EMBODIMENTS

The following description will discuss in detail an embodiment of the preset invention with reference to the drawings. Note that identical reference numerals are given to members having respective identical functions and operations, and descriptions of such members are omitted.

[Embodiment]

(Configuration of Reflective Display Device 10)

A configuration of a reflective display device that includes a front light of the embodiment of the present invention will be described with reference to FIG. 2. (a) of FIG. 2 is a perspective view illustrating a reflective display device 10 in accordance with the embodiment of the present invention. (b) of FIG. 2 is a cross-sectional view illustrating the reflective display device 10. (c) of FIG. 2 is an enlarged view illustrating a cross section of dots 4 on a light guide plate 9 in accordance with the embodiment of the present invention.

As illustrated in (a) of FIG. 2, the reflective display device 10 includes (i) a display panel 5, and (ii) a front light 1 which is provided on a side of the display device 5, on which side a user views an image on the display panel 5 (hereinafter referred to as a user side). The front light 1 includes (i) the light guide plate 9, and (ii) a light source(s) 8 which is provided on at least one of side surfaces 20c through 20f of the light guide plate 9. In (a) of FIG. 2, the light source(s) 8 is provided on the side surface 20c. As illustrated in (b) of FIG. 2, the light guide plate 9 has a surface 20a which faces a user and is processed to be flat so that light is sufficiently guided. A plurality of dots 4 are provided on the surface 20a. The plurality of dots 4 will be later described in detail.

A surface 20b opposite to the surface 20a is also processed to be flat so that light is sufficiently guided. The side surface 20c, on which the light source 8 is provided, can be flat, but is not limited to a specific shape. In a case where the light source 8 is, for example, a point light source such as a light emitting diode (LED), it is possible for light, emitted from the light source 8, to more uniformly enter the side surface 20c, by processing the side surface 20c to have (i) a light scattering surface such as a satin finish surface or (ii) a prism-shaped surface. On the other hand, the side surfaces 20d through 20f are preferably respective light reflective surfaces. This allows the light to (i) be guided and reach the side surfaces 20d through 20f and then (ii) be reflected from the side surfaces 20d through 20f and guided again inward the light guide plate 9. This ultimately allows an increase in light utilization efficiency. Such light reflective surfaces can be obtained by (i) forming a metal thin film made of a material such as aluminum, (ii) applying a material, such as a white ink, which has a high light reflectance, or (iii) separately attaching a member such as a light reflective sheet, on the side surfaces 20d through 20f. Note, however, that it goes without saying that, even in a case where the side surfaces 20d through 20f are not the respective light reflective surfaces, the effect of the present invention is brought about.

Examples of the light source 8 include an LED, a fluorescent tube, an electroluminescence (EL) light source, and a light source in which linear light guides are combined. Note that the color of light of the light source 8 is not necessarily limited to while, and can therefore be (i) a specific color other than white or (ii) different colors, for example, red (R), green (G) and blue (B) in combination.

The light guide plate 9 is suitably made of a material, such as a transparent resin (e.g., acrylic resin) or glass, which has a high transparency and less haze. Note that FIG. 2 illustrates a flat light guide plate 9, but the shape of the light guide plate 9 is not necessarily limited to such a flat shape, and can therefore be a wedge shape.

(Configuration of Dot 4)

The following description will discuss in detail a configuration of a dot 4. As has been described, the plurality of dots 4 are provided on the surface 20a of the light guide plate 9, which surface 20a faces a user. As illustrated in (c) of FIG. 2, each of the plurality of dots 4 includes a light reflective layer 2 and a dark layer 3. The light reflective layer 2 reflects light toward the display panel 5. In contrast, the dark layer 3 (i) absorbs light, (ii) completely covers the light reflective layer 2, and (iii) is in contact with the light guide plate 9 without any gap between the dark layer 3 and the light guide plate 9. Therefore, the light reflective layers 2 of the respective plurality of dots 4 are covered so as to be invisible even in a case where the plurality of dots 4 are viewed from any angles.

Figure 1:
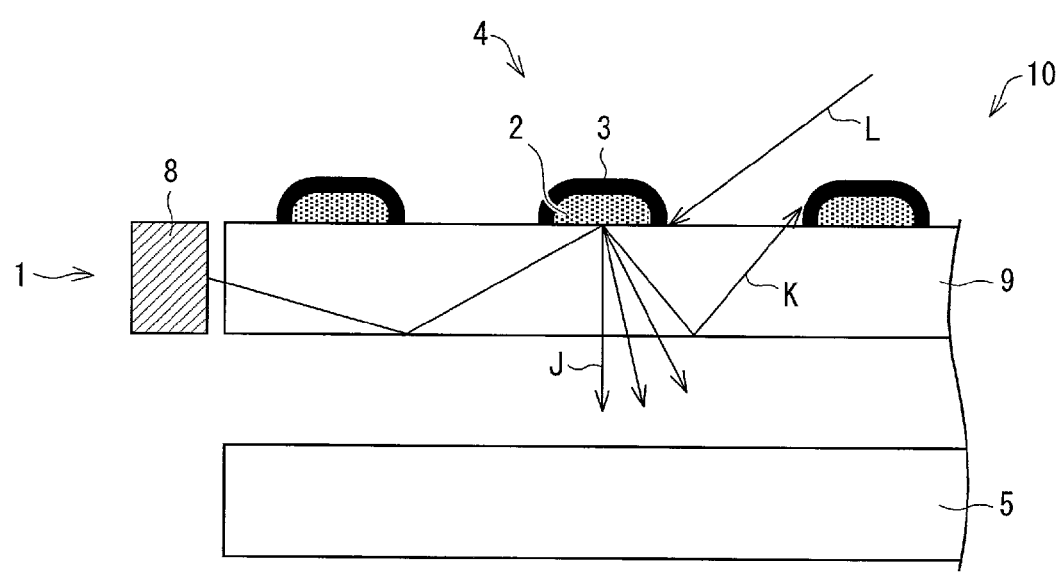
FIG. 1 is a cross-sectional view illustrating how light is reflected in a front light in accordance with an embodiment of the present invention.

The following description will discuss, with reference to FIG. 1, how light is reflected in the front light 1 in which such plurality of dots 4 are provided on the light guide plate 9. FIG. 1 is a cross-sectional view illustrating how light is reflected in the front light 1. As illustrated in FIG. 1, light emitted from the light source 8 is guided in the light guide plate 9. Most of the light emitted from the light source 8, like light J, is reflected from the light reflective layers 2 of the respective plurality of dots 4, and then exits toward the display panel 5. On the other hand, some of the light emitted from the light source 8, like light K, is guided in the light guide plate 9, exits toward a user, and is then absorbed by the dark layers 3 of the respective plurality of dots 4. Surrounding light L, such as outside light, which enters the dots 4 is also absorbed by the dark layers 3.

Since the light reflective layers 2 are completely covered by the dark layers 3 in the respective plurality of dots 4, it is possible for the dark layers 3 to absorb (i) light which has leaked from the light guide plate 9 toward a user and (ii) surrounding light which enters the dots 4. That is, since the light reflective layers 2 are not exposed in side surfaces of the respective plurality of dots 4, it is possible to prevent (i) the light which has leaked from the light guide plate 9 toward a user and (ii) the surrounding light which enters the dots 4, from being reflected by the light reflective layers 2 so as to exit toward the user. This ultimately allows the reflective display device 10 to carry out high-contrast display even when the reflective display device 10 is viewed from any angles.

(Method of Forming Dots 4)

It is preferable to form the dots 4 by use of a printing method such as an ink-jet printing method. This is because the printing method allows the dots 4 to be formed inexpensively. The following description will discuss how the dots 4 are formed by use of the ink-jet printing method. Note that, in the ink-jet printing method, (i) the light reflective layers 2 are formed with use of a white ink (light scattering material) which sufficiently reflects light and (ii) the dark layers 3 are formed with use of a black ink which sufficiently absorbs light.

First, a white ink is applied onto a surface 20a of a light guide plate 9, which surface 20a faces a user, and the white ink is irradiated with ultraviolet rays so as to be cured. This causes light reflective layers 2 to be formed. Then, a black ink is applied onto the light reflective layers 2 so as to cover the light reflective layers 2. The black ink is irradiated with ultraviolet rays so as to be cured. This causes dark layers 3 to be formed so as to cover the respective light reflective layers 2. Dots 4 are thus formed. Note that, in a case where a white ink and a black ink, which are not cured by ultraviolet rays, are employed, it is sometimes necessary to dry the white ink and the black ink.

The above description has discussed how the dots 4 are formed by use of the ink-jet printing method. However, how to form the dots 4 is not limited to the ink-jet printing method. Alternatively, (i) printing methods other than the ink-jet printing method or (ii) methods other than the printing methods can also be employed.

(How Dots 4 are Arranged)

As has been described, the plurality of dots 4 are arranged on the light guide plate 9. Note that it is preferable that the plurality of dots 4 are arranged at a constant ratio of occupied area of dots 4 per minimum unit area which can be recognized by human's eyes. For example, a plurality of dots 4, which are equal in size to each other, are arranged at regular intervals. In other words, the plurality of dots 4 are preferably arranged so as to have a constant area density per minimum unit area. The reason why the plurality of dots 4 are preferably arranged so as to have the constant area density per minimum unit area will be described below with reference to FIG. 3. (a) of FIG. 3 is a view illustrating an example arrangement in which a plurality of dots 4 are arranged at a constant area density of dots 4 per minimum unit area. (b) of FIG. 3 is a view illustrating an example arrangement in which a plurality of dots 4 are arranged so as not to have a constant area density per minimum unit area.

Each of the dark layers 3 of the respective plurality of dots 4 acts as a light shielding section. Therefore, in a case where an area density of dots 4 per minimum unit area is not constant, a transmittance of the light guide plate 9 is not uniform accordingly. This consequently causes a variation in reflection luminance of the reflective display device 10. However, the transmittance of the light guide plate 9 becomes uniform, i.e., constant, in a case where a ratio of occupied area of dots 4 in a region 21a that has a minimum unit area is equal to that of occupied area of dots 4 in a region 21b that has the minimum unit area, that is, in a case where an area density of the dots 4 in the region 21a is equal to that of the dots 4 in the region 21b (see (a) of FIG. 3). Therefore, the reflection luminance of the reflective display device 10 becomes uniform. This ultimately allows the reflective display device 10 to have a satisfactory display quality.

In contrast, the transmittance of the light guide plate 9 becomes nonuniform, in a case where a ratio of occupied area of dots 4 in a region 22a that has a minimum unit area is different from that of occupied area of dots 4 in a region 22b that has the minimum unit area, that is, in a case where an area density of the dots 4 in the region 22a is different from that of the dots 4 in the region 22b (see (b) of FIG. 3). Specifically, the transmittance of the light guide plate 9 is low in the region 22a which has a high area density of dots 4. This causes the reflective display device 10 to carry out a dark display in the region 22a. In contrast, the transmittance of the light guide plate 9 is high in the region 22b which has a low area density of dots 4. This causes the reflective display device 10 to carry out a bright display in the region 22b. As such, the plurality of dots 4 are preferably arranged on the light guide plate 9 so as to have a constant area density per minimum unit area, in order that the reflective display device 10 has a constant reflection luminance.

Note here that what is meant by "minimum unit area" is a minimum unit area that can be recognized by human's eyes. Specifically, the minimum unit area falls within a range from 0.5 mm×0.5 mm to 2 mm×2 mm, though the minimum unit area which can be recognized by human's eyes varies in individuals depending on, for example, age and/or eyesight. Even in a case where an area density of dots 4 per unit area (for example, 0.1 mm×0.1 mm) that cannot be recognized by human's eyes is not constant, the reflective display device 10 seems to have a substantially constant reflection luminance, provided that an area density of dots 4 per minimum unit area that can be recognized by human's eyes is constant.

(Arrangement Pattern 1 of Dots 4)

A concrete example of an arrangement pattern of dots 4 will be described below. (a) of FIG. 4 is a view illustrating an example of an arrangement pattern in which dots 4 are arranged on a light guide plate 9. (b) of FIG. 4 is an enlarged view illustrating the arrangement pattern illustrated in (a) of FIG. 4. (c) of FIG. 4 is an enlarged view illustrating a cross section of the dots 4 on the light guide plate 9.

An easiest way of arranging a plurality of dots 4 at a constant area density per minimum unit area is to arrange, at regular intervals, a plurality of dots 4 which are equal in size to each other (see (a) of FIG. 3). However, in a case where the plurality of dots 4 are arranged in a matrix manner identical to a matrix manner in which pixels of the display panel 5 are arranged, moire is sometimes caused due to interference between the arrangement of the pixels and the arrangement of the plurality of dots 4. Occurrence of such moire can be reduced by arranging the plurality of dots 4 so that the arrangement of the plurality of dots 4 is at an angle with the arrangement of the pixels.

Specifically, it is preferable that, in a case where the front light 1, in which the plurality of dots 4 are arranged in a matrix manner, is viewed from above, each line L1 in a row direction of the plurality of dots 4 is at an angle θ with any of four sides of the light guide plate 9 ((a) of FIG. 4). Furthermore, it is preferable that the angle θ falls within a range from 5° to 85°. This prevents interference between the arrangement of the pixels and the arrangement of the plurality of dots 4. It is therefore possible to reduce occurrence of moire.

Occurrence of moire can also be reduced by adjusting intervals at which the plurality of dots 4 are arranged. Specifically, it is preferable that intervals $P_1$ (see (b) of FIG. 4) at which the dots 4 are arranged on the each line L are adjusted so that a value, which is calculated by dividing, by the intervals $P_1$, intervals P at which the pixels are arranged, is not an integer. More specifically, it is preferable that the intervals $P_1$ satisfy $P_1/P=(n+0.2)$ to $(n+0.8)$ (where n is an integer) so that the value does not approximate an integer. For example, in a case where (i) the intervals P are 100 μm and (ii) the intervals $P_1$ are 200 μm, the intervals $P_1$ are twice (integral multiple) as large as the intervals P. In this case, moire is caused. On the other hand, in a case where (i) the intervals P are 80 μm and (ii) the intervals $P_1$ are 200 μm, the intervals $P_1$ are 2.5 times (non-integral multiple) as large as the intervals P. In this case, moire is unlikely to be caused. As such, it is possible to reduce occurrence of moire by adjusting the intervals $P_1$ so as to satisfy $P_1/P=(n+0.2)$ to $(n+0.8)$ (where n is an integer).

Note that occurrence of moire can also be reduced by changing the number of dots 4 per minimum unit area. The number of dots 4 per minimum unit area is changed as follows. That is, the plurality of dots 4 are arranged so as not to become uniform by changing the intervals $P_1$ and/or the size of each of the plurality of dots 4 while maintaining a constant ratio of occupied area of dots 4 per minimum unit area, so that the number of dots 4 per minimum unit area is changed.

(Arrangement Pattern 2 of Dots 4)

The above description has discussed the arrangement pattern of the plurality of dots 4 which allows a reduction in occurrence of moire. The following description will discuss an arrangement pattern which is suitably applicable not only to the purpose of reducing occurrence of moire but also to purposes other than the purpose of reducing occurrence of moire.

As illustrated in (a) of FIG. 4, it is preferable that the plurality of dots 4 are arranged in the matrix manner. It is more preferable that the plurality of dots 4 are arranged so as to be close-packed (delta configuration), as illustrated in (b) of FIG. 4. In other words, it is preferable that the plurality of dots 4 are arranged on the light guide plate 9 so that any one of the plurality of dots 4 is equally away from other dots 4 of the plurality of dots 4, which other dots 4 are closest to the any one of the plurality of dots 4. This causes three dots 4, which are closest to each other, to be apexes of an equilateral triangle. It follows that (i) the intervals $P_1$ at which the dots 4 are arranged on the each line L1 are equal to intervals $P_2$ between two dots 4, on respective adjacent lines L1 or on respective adjacent lines L2, which are closest to each other. A line obtained by connecting such two dots 4 is at an angle of 60° with each of lines L1 and lines L2. As illustrated in (c) of FIG. 4, light emitted from the light source 8 is reflected by each of the plurality of dots 4 toward the display panel 5 while broadening. Therefore, it is possible to uniformly irradiate the display panel 5 with light reflected by each of the plurality of dots 4, by arranging the plurality of dots 4 so as to be close-packed.

Furthermore, it is preferable that the size of each of the plurality of dots 4, that is, a size $S_1$ of each of the dark layers 3 (a width of each of the dark layers 3) is smaller than the size of each of the pixels. This is because, in a case where the size $S_1$ is equal to or larger than the size of each of the pixels, each of the plurality of dots 4 (dark layers 3) hides a corresponding specific pixel(s). This causes a part corresponding to each of the plurality of dots 4 to be displayed as if it looked like a hole.

Note that it is preferable that a height H of each of the plurality of dots 4 is as low as possible. This is because it is possible to reduce a thickness of a corresponding one of the light reflective layers 2 as the height H is reduced. Note, however, that the height H is not limited to a specific height. The height H can be determined as appropriate in accordance with a reflectance of the light reflective layers 2 and/or a light absorbancy of the dark layers 3.

Note that the plurality of dots 4 are arranged at a constant ratio of occupied area per minimum unit area so that the reflective display device 10 has a constant reflection luminance. Note, however, that it is the dark layers 3 for shielding light to be reflected from the display panel 5 that actually affects the reflection luminance of the reflective display device 10. It is therefore unnecessary that the size of each of the light reflective layers 2 (the width of each of the light reflective layers 2) is always constant, provided that a ratio of occupied area of dark layers 3 per minimum unit area is constant. As such, it is possible to adjust an in-plane distribution of an emission luminance of the front light 1 by changing the size of each of the light reflective layers 2. This will be described below with reference to FIG. 5. (a) of FIG. 5 is a view illustrating an example arrangement pattern in which dots 4 are arranged on a light guide plate 9. (b) of FIG. 5 is a view illustrating a cross section taken along A-A' line illustrated in (a) of FIG. 5.

As illustrated in (b) of FIG. 5, dark layers 3 has a constant size $S_1$, whereas light reflective layers 2 vary in size $S_2$. Specifically, (i) the light reflective layers 2 of respective dots 4 are made smaller in size $S_2$ as the dots 4 are located closer to a light source 8 and (ii) the light reflective layers 2 of the respective dots 4 are made larger in size $S_2$ as the dots 4 are farther away from the light source 8. This makes it possible to adjust broadening of light reflected from the dots 4. It is therefore possible to uniform an in-plane distribution of luminance of a front light 1.

FIG. 6 is a view illustrating (i) light emission quantity of the front light 1 of the present embodiment and (ii) a distribution of the light emission quantity. As is clear from FIG. 6, the front light 1 can uniformly irradiate the display panel 5 with light, by employing the above-described preferable embodiment. It is also possible to (i) uniform the reflection luminance of the reflective display device 10 and (ii) reduce occurrence of moire. It is therefore possible to provide a reflective display device 10 which has a more satisfactory display quality.

Note that the present embodiment has described preferred arrangements and dimensions of the plurality of dots 4. Note, however, that such preferred arrangements and dimensions are not essential to the front light 1 of the present invention. The reflective display device 10 can carry out high-contrast display even when the reflective display device 10 is viewed from any angles, by arranging the front light 1 of the present invention so as to include (i) the light source 8 which r emits light outward, (ii) the light guide plate 9 which guides the light of the light source, and (iii) the plurality of dots 4 which are provided on a surface of the light guide plate 9, which surface faces a light exit surface of the light guide plate 9, each of the plurality of dots 4 including (a) the light reflective layer 2 which reflects light outward and is provided so as to be in contact with the light guide plate 9 and (b) the dark layer 3 which absorbs light, completely covers the light reflective layer 2, and is in contact with the light guide plate 9 without any gap between the light guide plate 9 and the dark layer 3.

[Modification]

The present invention is not limited to the description of the embodiment above, and can therefore be modified by a skilled person in the art within the scope of the claims. The following description will discuss modifications of the above-described embodiment.

(Modification 1)

Dots 4 can be formed not only by use of the printing method but also by use of, for example, a photolithographic method. A front light 1, in which dots 4 are formed by use of the photolithographic method, will be described below with reference to FIGS. 7 and 8. (a) of FIG. 7 is a cross-sectional view illustrating a reflective display device 10 in accordance with Modification 1 of the present invention. (b) of FIG. 7 is an enlarged view illustrating a cross section of the dots 4 on a light guide plate 9 in accordance with Modification 1 of the present invention. (a) through (f) of FIG. 8 are views illustrating a process of forming the dots 4 by use of the photolithographic method.

Steps of the process will be described below. Note that, in the process, light reflective layers 2 are formed with use of a white resist ink, and dark layers 3 are formed with use of a black resist ink. Examples of the white resist ink include "White Color Solder Resist" manufactured by TAIYO INK MFG CO., LTD. Examples of the black resist ink include "Pigment Dispersed Black Resist for Forming Black Matrix of Color Filter" manufactured by TOKYO OHKA KOGYO CO., LTD.

First, a white resist ink 2' is applied onto an entire surface of an acrylic plate which serves as a light guide plate 9 (see (a) of FIG. 8). The white resist ink 2' is irradiated with ultraviolet rays via a photomask 6 so as to be partially exposed to light (see (b) of FIG. 8). Then, the white resist ink 2' is developed by use of a developing solution. This causes parts of the white resist ink 2' which have been exposed to light to be left. Light reflective layers 2 are thus formed (see (c) of FIG. 8).

Next, a black resist ink 3' is applied onto the entire surface of the acrylic plate on which the light reflective layers 2 are formed (see (d) of FIG. 8). The black resist ink 3' is irradiated with ultraviolet rays via a photomask 7 so as to be partially exposed to light (see (e) of FIG. 8). Then, the black resist ink 3' is developed by use of a developing solution. This causes parts of the black resist ink 3' which have been exposed to light to be left and dark layers 3 to be formed (see (f) of FIG. 8). A plurality of dots 4 are thus formed.

The plurality of dots 4 thus formed (see (a) of FIG. 7) are identical to those which have been described in the above embodiment. Note, however, that the photolithographic method has an advantage that it is possible to form the plurality of dots 4 more precisely than by use of the printing method, though the photolithographic method requires a higher cost than the printing method. Therefore, the photolithographic method allows dots 4 to be formed smaller (narrower in width) at small intervals.

By use of the printing method, it is difficult to form dots 4 each of which is, for example, not more than 20 μm in size (width) which cannot be recognized by human's eyes. In contrast, it is possible to easily form such small dots 4 by use of the photolithographic method. Note that, as the size of each dot 4 becomes smaller, it becomes more difficult for human's eyes to recognize the each dot 4. The photolithographic method has advantages that (i) display quality of the reflective display device 10 is improved and (ii) moire is unlikely to be caused because the size of each of the dots 4 is remarkably smaller than the size of each pixel in the reflective display device 10.

Note also that, (i) since each dot 4, formed by use of the printing method, has a round shape, a thickness of the each dot 4 is not constant and (ii) since each light reflective layer 2 has a thin thickness in the vicinity of its periphery, there is a tendency to decrease a light reflectance in the vicinity of the periphery. In contrast, each of the light reflective layers 2, which are formed by use of the photolithographic method, is relatively flat (see (b) of FIG. 7). This allows each of the light reflective layers 2 of the respective dots 4 to have a constant and high light reflectance.

(Modification 2)

FIG. 9 is an enlarged view illustrating a cross section of dots 4 on a light guide plate 9 in accordance with Modification 2 of the present invention. As illustrated in FIG. 9, the dots 4 can be formed by (i) forming recesses in the light guide plate 9 in advance, (ii) filling the recesses with white ink so that light reflective layers 2 are formed in the respective recesses, and (iii) further applying black ink onto the light reflective layers 2 so that respective dark layers 3 are formed. The dots 4 thus formed less protrude from the light guide plate 9, as compared with a case where light reflective layers 2 and dark layers 3 are formed not in respective recesses which are formed in a light guide plate 9 but on the light guide plate 9. It is therefore possible to prevent the dots 4 from being exfoliated by being caught on something.

(Modification 3)

FIG. 10 is an enlarged view illustrating a cross section of dots 4 on a light guide plate 9 in accordance with Modification 3 of the present invention. As illustrated in FIG. 10, light reflective layers 2 can be made of a metal material 2a such as (i) silver ink (e.g., silver paste) or (ii) a metal thin film (e.g., an aluminum film or a silver film), instead of white ink. First light reflective layers 2 made of the metal material 2a each have a high mirror reflectivity, whereas second light reflective layers 2 made of white ink each have a high light scattering property. Therefore, the first light reflective layers 2 are expected to have high light reflectivity. Note, however, that, in a case where the first light reflective layers 2 each have a full mirror reflectivity, light from a display panel 5 cannot exit from the light guide plate 9.

It is therefore preferable that the first light reflective layers 2 each further have a light scattering property. For example, light scattering surfaces 23 (covexoconcave surfaces) such as prismatic surfaces or satin finish surfaces are formed, in advance, on the light guide plate 9, and then light reflective layers 2 are formed on the respective light scattering surfaces 23 with use of the metal material 2a such as silver ink or a metal thin film. Each of the light reflective layers 2 thus formed has a white mirror surface. This allows light to efficiently exit from the light guide plate 9. Particularly, the first light reflective layers 2 reflects light more than the second light reflective layers 2, though each of the first light reflective layers 2 has a thickness smaller than that of the second light reflective layers 2. This gives rise to an advantage that each of the dots 4 can have a reduced height.

(Modification 4)

FIG. 11 is an enlarged view illustrating a cross section of dots 4 on a light guide plate 9 in accordance with Modification 4 of the present invention. As illustrated in FIG. 11, each light reflective layer 2 can be alternatively a combined layer in which a plurality of materials are stacked. For example, the each light reflective layer 2 can be formed by (i) forming a first layer made of white ink 2b on the light guide plate 9 and then (ii) stacking, on the first layer, a second layer made of the metal material 2a such as silver ink or a metal thin film. With the configuration, light, which has not been scattered by the first layer but has passed through the first layer, can be reflected by the second layer toward the light guide plate 9. It is therefore possible to (i) reduce light to be absorbed by dark layers 3 and (ii) increase a light utilization efficiency. In especial, like Modification 3, it is possible for the each light reflective layer 2 to have high light reflectivity while decreasing a thickness. This gives rise to an advantage that it is possible to decrease a height of each of the dots 4. Unlike Modification 3, it is possible to efficiently reflect light from the light guide plate 9 on an unprocessed flat light guide plate 9, instead of forming light scattering surface 23. This allows a process of forming a front light 1 to be simplified.

(Modification 5)

FIG. 12 is a cross-sectional view illustrating a reflective display device 10 in accordance with Modification 5 of the present invention. As illustrated in FIG. 12, various functional layers 24 can be provided, for example, on surfaces of a light guide plate 9 ((i) a surface 20a of the light guide plate 9, which surface 20a faces a user, and (ii) a surface 20b opposite to the surface 20a) or a display surface of a display panel 5. Examples of the functional layers 24 include a reflection preventing layer which prevents light from reflecting, a hard coat layer which protects a surface from being damaged, and an antistatic layer which prevents dust from adhering to a surface.

Such a functional layer 24 can be formed directly on the surfaces of the light guide plate 9. Alternatively, such a functional layer 24 can be formed by combining a layer which is separately formed and the light guide plate 9 or the display panel 5. Note that, in a case where a functional layer 24 is provided on the surface 20a, it is preferable to carry out a direct application or vapor deposition with respect to the surface 20a. This is because it is not possible to combine a film-shaped functional layer 24 and the light guide plate 9 via the surface 20a due to dots 4 which are formed on the surface 20a.

In a case where the reflection preventing layer is employed as a functional layer 24, surrounding light such as outside light is not reflected from the surfaces of the light guide plate 9 or from the display surface of the display panel 5. This brings about an effect of increasing contrast of display particularly in a bright place. Note that examples of the reflection preventing layer include (i) a multiple layer made up of layers having different refractive indexes and (ii) a layer having a moth-eye structure. Any of such reflection preventing layers can be employed as a functional layer 24. Examples of the hard coat layer and the antistatic layer include SUMICEFINE ASHC-204 manufactured by Sumitomo Osaka Cement Co., Ltd.

In a case where the hard coat layer is employed as a functional layer 24, it is possible to prevent the light guide plate 9 from being damaged. In a case where a part of the light guide plate 9 is damaged, light cannot be guided in such a part, and therefore leaks out. This causes white light to exit from a display surface of the reflective display device 10. It follows that display quality of the reflective display device 10 is deteriorated. However, such a problem can be prevented by providing the hard coat layer on the light guide plate 9.

In a case where the antistatic layer is employed as a functional layer 24, it is possible to prevent dust from adhering to the surfaces of the light guide plate 9. In a case where dust adheres to a part of the surfaces of the light guide plate 9, white light scatters in such a part. This causes a deterioration in display quality of the reflective display device 10. Moreover, in a case where dust, which is large enough to be recognized by human's eyes, gets in a space between the light guide plate 9 and the display panel 5 during assembling of the reflective display device 10, the dust cannot be eliminated unless the light guide plate 9 is detached from the reflective display device 10. This causes inadequate assembling. However, by employing the antistatic layer, it is possible to (i) prevent dust from adhering to the surfaces of the light guide plate 9 and (ii) prevent dust from getting in the space between the light guide plate 9 and the display panel 5.

(Modification 6)

FIG. 13 is a cross-sectional view illustrating a reflective display device 10 in accordance with Modification 6 of the present invention. As illustrated in FIG. 13, in a case where a functional layer 24 is provided on a surface 20a of a light guide plate 9, which surface 20a faces a user, the functional layer 24 can be formed on the surface 20a before a plurality of dots 4 are formed on the surface 20a. In a case it is difficult to form a functional layer 24 on a light guide plate 9 on which a plurality of dots 4 have been formed, it is possible to easily form the functional layer 24 by forming the functional layer 24 on the light guide plate 9 before forming the plurality of dots 4 on the light guide plate 9. In such a case, it is further possible to combine (i) a functional layer 24, which is formed in a film shape, and (ii) the light guide plate 9 via the surface 20a. This allows a process of forming a front light 1 to be simplified.

(Modification 7)

FIG. 14 is a cross-sectional view illustrating a reflective display device 10 in accordance with Modification 7 of the present invention. As illustrated in FIG. 14, a functional layer 24 can be formed on a planarizing layer 25 after the planarizing layer 25 is formed on a surface 20a of a light guide plate 9, which surface 20a faces a user. In a case where it is difficult to form a functional layer 24 directly on a light guide plate 9 on which dots 4 have been formed, it is possible to easily form the functional layer 24 by (i) planarizing, with use of a planarizing layer 25, a surface 20a on which the dots 4 are formed, and then (ii) combining the functional layer 24 and the planarizing layer 25. Furthermore, it is possible to employ a functional layer 24 which is formed in a film shape. This allows a process of forming a front light 1 to be simplified. Moreover, since the dots 4 are planarized with use of the planarizing layer 25, there is no possibility that the dots 4 are exfoliated. Particularly, in a case where a hard coat layer is employed as a functional layer 24, it is possible to further improve its performance.

Note here that the planarizing layer 25 needs to have at least translucency. Note also that the planarizing layer 25 preferably has a refractive index lower than that of the light guide plate 9. The reason why the planarizing layer 25 preferably has the refractive index smaller than that of the light guide plate 9 will be described below with reference to FIG. 15. FIG. 15 is an enlarged view illustrating a cross section of the dots 4 on the light guide plate 9 in accordance with Modification 7) of the present invention.

In a case where the planarizing layer 25 is made of a material having a refractive index larger than that of the light guide plate 9, light N, which is guided in the light guide plate 9, gets in the planarizing layer 25, and is then absorbed by a dark layer 3 (see FIG. 15). In contrast, in a case where a planarizing layer 25 is made of a material having a refractive index smaller than that of the light guide plate 9, light M, which is guided in the light guide plate 9, is hard to get in the planarizing layer 25 (see FIG. 15). It is therefore possible to prevent the light M from being absorbed by the dark layer 3. As such, it is preferable that the planarizing layer 25 has a refractive index smaller than that of the light guide plate 9.

(Modification 8)

FIG. 16 is a cross-sectional view illustrating a reflective display device 10 in accordance with Modification 8 of the present invention. As illustrated in FIG. 16, it is possible to combine a light guide plate 9 and a display panel 5, via a low-refractive layer 26. Specifically, the low-refractive layer 26 is made of a material having a refractive index smaller than that of the light guide plate 9. It is preferable that the refractive index of the low-refractive layer 26 is not more than 1.45. Examples of a material for the low-refractive layer 26 include a UV curable resin "OPSTAR" manufactured by JSR Corporation.

By combining, via the low-refractive layer 26, the light guide plate 9 and the display panel 5, it is possible to bring about an effect similar to that brought about in a case where a reflection preventing layer on each of the light guide plate 9 and the display panel 5 is employed as a functional layer 24 (see Modification 5). Specifically, refractive index does not match between (i) an interface between the low-refractive layer 26 and the light guide plate 9 and (ii) an interface between the low-refractive layer 26 and the display panel 5. Therefore, there remains some of surrounding light which is reflected from a surface of the light guide plate 9 or a display surface of the display panel 5. However, it is possible to reduce surrounding light which is reflected from the surface of the light guide plate 9 or the display surface of the display panel 5, as compared with a case where both the surface of the light guide plate 9 and the display surface of the display panel 5 are in contact with air.

(Modification 9)

FIG. 17 is a cross-sectional view illustrating a reflective display device 10 in accordance with Modification 9 of the present invention. As illustrated in FIG. 17, an LED 8a, which is capable of emitting different-colored beams of light, can be employed as a light source 8. In a case where the LED 8a is employed as the light source 8a, a field sequential display method is employed in which color display is carried out with use of an effect of afterimage by causing the LED 8a to sequentially emit the different-colored beams of light so as to obtain each transmittance in accordance with a corresponding color component of an image to be displayed. For example, it is possible to carry out full-color display by causing an LED 8a, which emits red (R) light, green (G) light, and blue (B) light, to sequentially emits red (R) light, green (G) light, and blue (B) light for 6 msec (for each one-third frame time period) for each color.

In the case where the LED 8a, which is capable of emitting the different-colored beams of light, is employed as a light source 8, a monochromatic display panel 5a can be employed as a display panel 5. The monochromatic display panel 5a does not require any color filter. Therefore, no decrease in reflectance is caused due to a color filter. It is therefore possible to obtain a reflective display device 10 having a high reflectance.

(Modification 10)

FIG. 18 illustrates yet Modification 10 of the present invention. (a) of FIG. 18 is a cross-sectional view illustrating a reflective display device 10 in accordance with Modification 10 of the present invention. (b) of FIG. 18 is an enlarged view illustrating a cross section of dots 4 on a light guide plate 9 in accordance with Modification 10 of the present invention.

As illustrated in (a) of FIG. 18, a blue LED 8b is employed as a light source 8. As illustrated in (b) of FIG. 18, each of the dots 4 can be formed by (i) forming a yellow fluorescent layer 27 on the light guide plate 9, (ii) forming a light reflective layer 2 on the yellow fluorescent layer 27, and then (iii) covering the yellow fluorescent layer 27 and the light reflective layer 2 with a dark layer 3. In this case, the yellow fluorescent layer 27 utilizes a characteristic in which fluorescence is generated when blue light, emitted from the blue LED 8b, passes through the yellow fluorescent layer 27. Therefore, a front light 1 generates white light by mixing (i) blue light, emitted from the blue LED 8b, as it is, with (ii) yellow light generated as fluorescence by causing blue light emitted from the blue LED 8b to pass through the yellow fluorescent layer 27. The front light 1 irradiates a display panel 5 with the white light. Such white light generated by use of the blue LED 8b and the yellow fluorescent layer 27 can be used to carry out display.

(Modification 11)

FIG. 19 illustrates Modification 11 of the present invention. (a) of FIG. 19 is a cross-sectional view illustrating a reflective display device 10 in accordance with Modification 11 of the present invention. (b) of FIG. 19 is an enlarged view illustrating a cross section of dots 4 on a light guide plate 9 in accordance with Modification 11 of the present invention.

According to the reflective display device 10, a near-ultraviolet LED 8c is employed as a light source 8 (see (a) of FIG. 19), and each of the dots 4 can be formed as follows (see (b) of FIG. 19). Specifically, each of the dots 4 is formed by (i) forming, on the light guide plate 9, an RGB fluorescent layer 28 in which a red fluorescent layer, a green fluorescent layer, and a blue fluorescent layer are combined, (ii) forming a light reflective layer 2 on the RGB fluorescent layer 28, and then (iii) covering the RGB fluorescent layer 28 and the light reflective layer 2 with a dark layer 3. In this case, a characteristic is utilized in which fluorescence is generated when near-ultraviolet rays emitted from the near-ultraviolet LED 8c pass through the RGB fluorescent layer 28. As such, in a case where fluorescence is generated when near-ultraviolet rays, emitted from the near-ultraviolet LED 8c of a front light 1, pass through the RGB fluorescent layer 28, white light is generated in which red light, green light, and blue light are mixed. A display panel 5 is irradiated with the white light thus generated. The white light generated by use of the near-ultraviolet LED 8c and the RGB fluorescent layer 28 can be used to carry out display.

(Modification 12)

FIG. 20 is a cross-sectional view illustrating a reflective display device 10 in accordance with Modification 12 of the present invention. The reflective display device can also serve as a touch panel (see FIG. 20). Specifically, a transparent electrode 29 is provided on a surface 20b of a light guide plate 9, which surface 20b faces a surface 20a of the light guide plate 9, the surface 20a facing a user. According to the reflective display device 10, electrostatic capacitance, generated when touching the transparent electrode 29 with a finger or with the use of other means, is detected. This allows the reflective display device 10 to serve as a touch panel. As such, it is unnecessary to separately provide a touch panel. This allows a reduction in thickness of the reflective display device 10.

(Modification 13)

FIG. 21 illustrates reflective display devices 10 in accordance with Modification 13 of the present invention. (a) of FIG. 21 is a view illustrating a display panel 5 to or from which a front light 1 can be attached or detached. (b) of FIG. 21 is a view illustrating a display panel 5 which is combined with a front light 1 that can cover the display panel 5.

As illustrated in FIG. 21, it is not always necessary to fixedly provide the front light 1 on a side of a display surface of the display panel 5. The front light 1 can be alternatively attached to or detached from the display panel 5. For example, as illustrated in (a) of FIG. 21, the front light 1 can be configured to be attached to or detached from the display device 5 so that the front light 1 is attached to the display panel 5 via a member such as a claw or a magnet when the front light 1 is necessitated. Alternatively, as illustrated in (b) of FIG. 21, the front light 1 is provided so as to be rotatable around an end part of the display panel 5. Specifically, the front light 1 is rotated around the end part so as to cover the display surface of the display panel 5, when the front light 1 is necessitated.

Note that the reflective display device 10 is a non-light emitting display device, such as a reflective liquid crystal display device, an electrophoretic display device, or an electrowetting display device, which carries out display while reflecting surrounding light such as outside light. The reflective display device 10 is applicable to an electronic device such as a mobile phone, a smart phone, or a laptop personal computer. As to such an electronic device, how to attach the front light 1 to the display panel is not particularly limited. For example, in a case where the front light 1 is configured to be attached to or detached from the display device, the front light 1 can be attached to the display device only when needed. It is thus possible to use the front light 1 in accordance with an environment where the front light 1 is used.

The present invention is not limited to the description of the embodiment and modifications above, and can therefore be modified by a skilled person in the art within the scope of the claims. Namely, an embodiment derived from a proper combination of technical means disclosed in different embodiments or modifications is encompassed in the technical scope of the present invention.

[Summary of Embodiment]

In order to attain the object, a front light of an embodiment of the present invention is configured to include: a light source for emitting light outward; a light guide plate for guiding the light of the light source; and a plurality of dots, provided on a surface of the light guide plate, which surface faces a light exit surface of the light guide plate, each of the plurality of dots including (i) a light reflective layer for reflecting light, the light reflective layer being provided so as to be in contact with the light guide plate and (ii) a dark layer for absorbing light, the dark layer completely covering the light reflective layer so as to be in contact with the light guide plate without any gap between the light guide plate and the dark layer.

According to the configuration, the front light of the embodiment of the present invention includes the plurality of dots each of which includes the light reflective layer and the dark layer. The dark layer completely covers the light reflective layer, and is in contact with the light guide plate without any gap between the light guide plate and the dark layer. That is, the light reflective layers of the respective plurality of dots are covered with the respective dark layers so as to be invisible even in a case where the plurality of dots are viewed from any angles.

In a case where such plurality of dots are formed on the light guide plate, light emitted from the light source is (i) guided in the light guide plate, and (ii) reflected by the light reflective layers, and then exits from the light exit surface. Some of the light emitted from the light source is guided in the light guide plate, and then exits toward a user. However, the light, which has exited toward the user, is absorbed by the dark layers. Surrounding light, such as outside light, which has entered the front light, is also absorbed by the dark layers.

Since the light reflective layers are completely covered by the dark layers in the respective plurality of dots, it is possible for the dark layers to absorb (i) light which has leaked from the light guide plate toward a user and (ii) surrounding light which enters the front light. That is, since the light reflective layers are not exposed in side surfaces of the respective plurality of dots, it is possible to prevent (i) the light which has leaked from the light guide plate toward a user and (ii) the surrounding light which enters the front light, from being reflected by the light reflective layers to exit toward the user. Therefore, by employing the front light of the embodiment of the present invention, a display device can carry out high-contrast display even when the display device is viewed from any angles.

The front light of the embodiment of the present invention is configured so that the plurality of dots are arranged on the light guide plate at a constant ratio of occupied area of dots per certain unit area.

According to the configuration, each of the dark layers of the respective plurality of dots acts as a light shielding section. Therefore, in a case where an area density of dots 4 per unit area is not constant, a transmittance of the light guide plate is not uniform accordingly. This consequently causes a variation in reflection luminance of a reflective display device which includes the front light. However, the transmittance of the light guide plate becomes uniform, i.e., constant, in a case where the area density of dots per unit area is constant. Therefore, the reflection luminance of the reflective display device becomes uniform. This ultimately allows the reflective display device to have a satisfactory display quality.

The front light of the embodiment of the present invention is configured so that the light reflective layers of the respective plurality of dots are smaller in size as the plurality of dots are located closer to the light source, whereas the light reflective layers of the respective plurality of dots are larger in size as the plurality of dots are farther away from the light source.

The configuration makes it possible to adjust broadening of light reflected from the dots. It is therefore possible to uniform an in-plane distribution of luminance of the front light.

The front light of the embodiment of the present invention is configured so that the plurality of dots are arranged, in a matrix manner, (i) at regular intervals in a row direction of the plurality of dots and (ii) at regular intervals in a column direction of the plurality of dots.

According to the configuration, the plurality of dots are arranged at a constant area density of dots per unit area. This allows a reflective display device which includes the front light to have a uniform reflection luminance.

The front light of the embodiment of the present invention is configured so that each of the plurality of dots, and corresponding two of the plurality of dots, located closest to the each of the plurality of dots, are apexes of an equilateral triangle.

Light emitted from the light source is reflected by each of the plurality of dots toward the light exit surface while broadening. Therefore, according to the configuration, it is possible to uniformly irradiate the light exit surface with light reflected by each of the plurality of dots, by arranging the plurality of dots as to be close-packed.

The front light of the embodiment of the present invention is configured so that, in a case where the light guide plate is viewed from a light exit surface side, the row direction is at an angle ranging from 5° to 85° with any of four sides of the light guide plate.

In a case where the plurality of dots are arranged in a matrix manner identical to a matrix manner in which pixels are arranged in a reflective display device which includes the front light, moire is sometimes caused due to interference between the arrangement of the pixels and the arrangement of the plurality of dots. However, such interference is not caused by arranging the plurality of dots so that the row direction is at an angle with any of four sides of the light guide plate according to the configuration. It is therefore possible to reduce occurrence of moire.

The front light of the embodiment of the present invention is configured so that the regular intervals in the row direction is (n+0.2) to (n+0.8) times as large as intervals at which pixels are arranged where n is an integer.

Moire is caused, in a case where a value, which is calculated by dividing, by the regular intervals in the row direction, the intervals at which the pixels are arranged, is an integer. Therefore, it is preferable that the regular intervals in the row direction is (n+0.2) to (n+0.8) times as large as the intervals at which the pixels are arranged (where n is an integer) so that the value does not approximate an integer. As such, it is possible to reduce occurrence of moire.

The front light of the embodiment of the present invention is configured so that the dark layers of the respective plurality of dots are each smaller in size than a pixel.

In a case where the size of each of the dark layers is equal to or larger than the size of each pixel, each of the dots (dark layers) hides a corresponding specific pixel(s). This causes a part corresponding to each of the dots to be displayed as if it looked like a hole. According to the configuration, however, such display can be prevented.

The front light of the embodiment of the present invention is configured so that each of the dark layers is not more than 20 µm in size.

According to the configuration, it is possible to improve display quality and reduce occurrence of moire. This is because, as the size of each of the dots becomes smaller, it becomes more difficult for human's eyes to recognize the dots.

The front light of the embodiment of the present invention is configured so that the light source is provided on any of four side surfaces other than (i) the light exit surface of the light guide plate and (ii) the surface of the light guide plate which surface faces the light exit surface, and a side surface of the four side surfaces, on which side surface the light source is not provided, is a light reflective surface.

The configuration allows light to (i) be guided in the light guide plate and reach the light reflective surface and then (ii) reflected from the light reflective surface and guided again inward the light guide plate. This ultimately allows an increase in light utilization efficiency.

It is preferable to configure the front light of the embodiment of the present invention so that the light reflective layers of the respective plurality of dots are respective light scatterers.

The configuration allows the light reflective layers to reflect and scatter light.

It is preferable to configure the front light of the embodiment of the present invention so that convexoconcave surfaces are provided, on the light guide plate, for the respective light reflective layers, and the convexoconcave surfaces are coated with a metal material so as to serve as the respective light reflective layers.

According to the configuration, each of the light reflective layers formed on the respective convexoconcave surfaces has a white mirror surface. This allows light to efficiently exit from the light guide plate. Particularly, in a case where the convexoconcave surfaces are coated with the metal material so as to serve as the respective light reflective layers, it is possible to attain a high light reflectivity, though each of the light reflective layers has a reduced thickness. This gives rise to an advantage that each of the plurality of dots can have a reduce height.

The front light of the embodiment of the present invention is configured so that each of the light reflective layers is provided by stacking, on the light guide plate, a light scatterer and a metal material in this order.

With the configuration, light, which has not been scattered by the light scatterer but has passed through the light scatterer, can be reflected by the metal material toward the light guide plate. It is therefore possible to (i) reduce light to be absorbed by the dark layers and (ii) increase a light utilization efficiency. In especial, it is possible for each of the light reflective layers containing the metal material to have high light reflectivity while decreasing a thickness. This gives rise to an advantage that it is possible to decrease a height of each of the plurality of dots.

The front light of the embodiment of the present invention is configured so that recesses are provided, in the light guide plate, for the respective light reflective layers, and the light reflective layers are provided in the respective recesses.

According to the configuration, it is possible to reduce how much each of the plurality of dots protrudes from the light guide plate. It is therefore possible to prevent the plurality of dots from being exfoliated by being caught on something.

The front light of the embodiment of the present invention is configured so that a functional layer is provided on the surface of the light guide plate on which surface the plurality of dots are provided.

According to the configuration, various functional layers can be provided in the front light.

The front light of the embodiment of the present invention is configured so that the light source is capable of emitting different-colored beams of light.

According to the configuration, it is possible to employ a field sequential display method in which color display is carried out with use of an effect of afterimage by causing the light source to sequentially emit the different-colored beams of light so as to obtain each transmittance in accordance with a corresponding color component of an image to be displayed.

The front light of the embodiment of the present invention is configured so that the light source is a light source which emits blue light, and yellow fluorescent layers are provided in the respective plurality of dots between the respective light reflective layers and the light guide plate.

According to the configuration, it is possible to carry out display with use of white light which is generated by use of (i) the light source which emits blue light and (ii) the yellow fluorescent layers.

The front light of the embodiment of the present invention is configured so that (i) the light source is a light source which emits near-ultraviolet light, and (ii) a red fluorescent layer, a green fluorescent layer, and a blue fluorescent layer are provided in each of the plurality of dots between a corresponding one of the light reflective layers and the light guide plate.

According to the configuration, it is possible to carry out display with use of white light which is generated by use of (i) the light source which emits near-ultraviolet light and (ii) the red fluorescent layer, the green fluorescent layer, and the blue fluorescent layer.

The front light of the embodiment of the present invention is configured so that a functional layer is provided on a surface of the light guide plate, on which surface the plurality of dots are provided, so as to cover the plurality of dots.

According to the configuration, various functional layers can be provided in the front light.

The front light of the embodiment of the present invention is configured so that a functional layer is provided on the surface of the light guide plate, which surface faces the light exit surface, and the plurality of dots are provided on a first surface of the functional layer, which first surface is opposite to a second surface of the functional layer, which second surface is in contact with the light guide plate.

In a case where it is difficult to provide a functional layer on a light guide plate on which dots have been provided, it is possible to easily provide the functional layer by, according to the configuration, providing the functional layer on the light guide plate before providing the dots on the light guide plate.

The front light of the embodiment of the present invention is configured so that a planarizing layer is provided so as to planarize a surface of the light guide plate, on which surface the plurality of dots are provided, and a functional layer is provided on a first surface of the planarizing layer, which first surface is opposite to a second surface of the planarizing layer, which second surface is in contact with the light guide plate.

In a case where it is difficult to provide a functional layer directly on a light guide plate on which dots have been provided, is it possible to easily provide the functional layer by, according to the configuration, (i) planarizing, with use of a planarizing layer, a surface of the light guide plate, which surface faces a user, and (ii) combining a functional layer and the planarizing layer.

The front light of the embodiment of the present invention is configured so that a functional layer is formed on the light exit surface of the light guide plate.

According to the configuration, various functional layers can be provided on the light exit surface of the light guide plate.

The front light of the embodiment of the present invention is configured so that the functional layer has any of a reflection preventing property, a hard coat property and an antistatic property.

According to the configuration, it is possible to provide, as a functional layer, a layer such as (i) a reflection preventing layer which prevents light from reflecting, (ii) a hard coat layer which protects a surface from being damaged or (iii) an antistatic layer which prevents dust from adhering to a surface.

The front light of the embodiment of the present invention is configured such that an electrode is provided on the light guide plate so that a reflective display device serves as a touch panel.

The configuration allows a reflective display device that is provided with the front light to serve as a touch panel. As such, it is unnecessary to separately provide a touch panel. This allows a reduction in thickness of the reflective display device.

In order to attain the object, a reflective display device of an embodiment of the present invention is configured to include: the above-described front light; and a display panel which is provided on a light exit surface side of the light guide plate.

According to the configuration, it is possible to provide a reflective display device which carries out high-contrast display even when the reflective display device is viewed from any angles.

The front light of the embodiment of the present invention is configured such that a space between the front light and the display panel is filled with a low-refractive resin whose refractive index is not more than 1.45.

According to the configuration, it is possible to reduce surrounding light which is reflected from the light exit surface of the light guide plate or a display surface of the display panel, as compared with a case where both the light exit surface of the light guide plate and the display surface of the display panel are in contact with air.

The front light of the embodiment of the present invention is configured such that the light source of the front light is capable of emitting different-colored beams of light, and the reflective display device displays an image by causing the light source to sequentially emit the different-colored beams of light.

According to the configuration, it is possible to employ a field sequential display method in which color display is carried out by use of an effect of afterimage by causing the light source to sequentially emit the different-colored beams of light so as to obtain each transmittance in accordance with a corresponding color component of an image to be displayed.

In order to attain the object, an electronic device of an embodiment of the present invention is configured to include the above-described reflective display device.

According to the configuration, it is possible to provide an electronic device having a display screen which carries out high-contrast display even when the display screen is viewed from any angles.

The front light of the embodiment of the present invention is configured such that the front light can be attached to or detached from the reflective display device.

According to the configuration, for example, the front light can be attached to the reflective display device only when needed. It is thus possible to use the front light in accordance with an environment where the front light is used.

In order to attain the object, a method, of an embodiment of the present invention, of producing a front light is configured to include the steps of: preparing a light source for emitting light outward; preparing a light guide plate for causing the light to exit from a light exit surface of the light guide plate while guiding the light of the light source; and providing a plurality of dots on a surface of the light guide plate, which surface faces the light exit surface, each of the plurality of dots including (i) a light reflective layer for reflecting light toward the light guide plate, and (ii) a dark layer for absorbing light, the dark layer completely covering the light reflective layer so as to be in contact with the light guide plate without any gap between the light guide plate and the dark layer.

According to the method, it is possible to provide a front light which allows a reflective display device to carry out high-contrast display even when the reflective display device is viewed from any angles.

The embodiments and specific examples of implementation discussed in the foregoing detailed explanation serve solely to illustrate the technical details of the present invention, which should not be narrowly interpreted within the limits of such embodiments and specific examples, but rather may be applied in many variations within the spirit of the present invention, provided that such variations do not exceed the scope of the patent claims set forth below.

INDUSTRIAL APPLICABILITY

A reflective display device of an embodiment of the present invention is applicable to an electronic device such as a mobile phone, a smart phone or a laptop personal computer.

REFERENCE SIGNS LIST

1: front light
2: light reflective layer
3: dark layer
4: dot
5: display panel
6 and 7: photomask
8: light source
9: light guide plate
10: reflective display device
11: front light
12: light reflective layer
13: dark layer
14: dot
15: display panel
18: light source
19: light guide plate
23: light scattering surface
24: functional layer
25: planarizing layer
26: low-refractive layer
27: yellow fluorescent layer
28: RGB fluorescent layer
29: transparent electrode
30: reflective display device

The invention claimed is:

1. A front light, comprising:
a light source for emitting light outward;
a light guide plate for guiding the light of the light source; and
a plurality of dots, provided on a surface of the light guide plate, which surface faces a light exit surface of the light guide plate,
each of the plurality of dots including (i) a light reflective layer for reflecting light, the light reflective layer being provided so as to be in contact with the light guide plate and (ii) a dark layer for absorbing light, the dark layer completely covering an upper surface and a side surface of the light reflective layer so as to be in contact with the light guide plate without any gap between the light guide plate and the dark layer.

2. The front light as set forth in claim 1, wherein:
the plurality of dots are arranged on the light guide plate at a constant ratio of occupied area of dots per certain unit area.

3. The front light as set forth in claim 2, wherein:
the light reflective layers of the respective plurality of dots are smaller in size as the plurality of dots are located closer to the light source, whereas the light reflective layers of the respective plurality of dots are larger in size as the plurality of dots are farther away from the light source.

4. The front light as set forth in claim 2, wherein:
the plurality of dots are arranged, in a matrix manner, (i) at regular intervals in a row direction of the plurality of dots and (ii) at regular intervals in a column direction of the plurality of dots.

5. The front light as set forth in claim 4, wherein:
each of the plurality of dots, and corresponding two of the plurality of dots, located closest to the each of the plurality of dots, are apexes of an equilateral triangle.

6. The front light as set forth in claim 4, wherein:
in a case where the light guide plate is viewed from a light exit surface side, the row direction is at an angle ranging from 5° to 85° with any of four sides of the light guide plate.

7. The front light as set forth in claim 4, wherein:
the regular intervals in the row direction is (n+0.2) to (n+0.8) times as large as intervals at which pixels are arranged where n is an integer.

8. The front light as set forth in claim 1, wherein:
the dark layers of the respective plurality of dots are each smaller in size than a pixel.

9. The front light as set forth in claim 1, wherein:
each of the dark layers is not more than 20 μm in size.

10. The front light as set forth in claim 1, wherein:
the light source is provided on any of four side surfaces other than (i) the light exit surface of the light guide plate and (ii) the surface of the light guide plate which surface faces the light exit surface, and
a side surface of the four side surfaces, on which side surface the light source is not provided, is a light reflective surface.

11. The front light as set forth in claim 1, wherein:
the light reflective layers of the respective plurality of dots are respective light scatterers.

12. The front light as set forth in claim 1, wherein:
convexoconcave surfaces are provided, on the light guide plate, for the respective light reflective layers, and
the convexoconcave surfaces are coated with a metal material so as to serve as the respective light reflective layers.

13. The front light as set forth in claim 1, wherein:
each of the light reflective layers is provided by stacking, on the light guide plate, a light scatterer and a metal material in this order.

14. The front light as set forth in claim 1, wherein:
recesses are provided, in the light guide plate, for the respective light reflective layers, and
the light reflective layers are provided in the respective recesses.

15. The front light as set forth in claim 1, wherein:
a functional layer is provided on the surface of the light guide plate on which surface the plurality of dots are provided.

16. A reflective display device, comprising:
a front light recited in claim 1; and
a display panel which is provided on a light exit surface side of the light guide plate.

17. The reflective display device as set forth in claim 16, wherein:
a space between the front light and the display panel is filled with a low-refractive resin whose refractive index is not more than 1.45.

18. The reflective display device as set forth in claim 16, wherein:
the light source of the front light is capable of emitting different-colored beams of light, and
the reflective display device displays an image by causing the light source to sequentially emit the different-colored beams of light.

19. An electronic device, comprising a reflective display device recited in claim 16.

20. The electronic device as set forth in claim 19, wherein:
the front light can be attached to or detached from the reflective display device.

* * * * *